(12) United States Patent
Izumikawa et al.

(10) Patent No.: US 10,687,026 B2
(45) Date of Patent: Jun. 16, 2020

(54) SHOVEL

(71) Applicant: SUMITOMO(S.H.I.) CONSTRUCTION MACHINERY CO., LTD., Tokyo (JP)

(72) Inventors: Takeya Izumikawa, Chiba (JP); Hidehiko Katoh, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 21 days.

(21) Appl. No.: 15/890,667

(22) Filed: Feb. 7, 2018

(65) Prior Publication Data

US 2018/0167588 A1 Jun. 14, 2018

Related U.S. Application Data

(63) Continuation of application No. PCT/JP2016/073380, filed on Aug. 9, 2016.

(30) Foreign Application Priority Data

Aug. 10, 2015 (JP) ................. 2015-158332

(51) Int. Cl.
*H04N 7/18* (2006.01)
*E02F 9/26* (2006.01)
*H04N 5/272* (2006.01)
*E02F 3/40* (2006.01)

(52) U.S. Cl.
CPC ............. *H04N 7/183* (2013.01); *E02F 3/40* (2013.01); *E02F 9/26* (2013.01); *H04N 5/272* (2013.01)

(58) Field of Classification Search
CPC . H04N 7/183; H04N 5/272; E02F 3/40; E02F 9/26
USPC ........................................................ 348/118
See application file for complete search history.

(56) References Cited

U.S. PATENT DOCUMENTS

| 7,532,967 | B2 | 5/2009 | Fujishima et al. |
| 9,616,748 | B2 | 4/2017 | Tsubone et al. |
| 9,650,755 | B2 | 5/2017 | Nomura et al. |
| 9,776,566 | B2 | 10/2017 | Ishimoto et al. |
| 2013/0158784 | A1 | 6/2013 | Fukano et al. |
| 2014/0100712 | A1 | 4/2014 | Nomura et al. |

(Continued)

FOREIGN PATENT DOCUMENTS

| JP | 2004-107926 | 4/2004 |
| JP | 2012-255286 | 12/2012 |

(Continued)

OTHER PUBLICATIONS

International Search Report for PCT/JP2016/073380 dated Oct. 11, 2016.

*Primary Examiner* — Jared Walker
(74) *Attorney, Agent, or Firm* — IPUSA, PLLC

(57) ABSTRACT

A shovel includes a lower travelling body; an upper turning body pivotably attached to the lower traveling body; a camera attached to the upper turning body; a processor; and a memory that includes instructions, which when executed, cause the processor to generate an output image including a camera image captured by the camera; and to display an image representing an extending direction of a work target surface or a direction orthogonal to the extending direction and the camera image while superposing the image on the camera image.

13 Claims, 13 Drawing Sheets

(56) References Cited

U.S. PATENT DOCUMENTS

| | | |
|---|---|---|
| 2014/0293051 A1 | 10/2014 | Nakamura et al. |
| 2014/0333455 A1* | 11/2014 | Lee .................... B62D 15/027 |
| | | 340/932.2 |
| 2015/0175071 A1* | 6/2015 | Ishimoto ................ E02F 9/262 |
| | | 348/148 |
| 2015/0218781 A1 | 8/2015 | Nomura et al. |
| 2015/0345114 A1 | 12/2015 | Nomura et al. |
| 2016/0006947 A1 | 1/2016 | Kowatari et al. |
| 2016/0024757 A1 | 1/2016 | Nomura et al. |
| 2016/0193920 A1* | 7/2016 | Tsubone ................ E02F 9/261 |
| | | 701/36 |
| 2016/0258134 A1 | 9/2016 | Matsumoto et al. |

FOREIGN PATENT DOCUMENTS

| | | |
|---|---|---|
| JP | 2013-113044 | 6/2013 |
| JP | 2013-121056 | 6/2013 |
| JP | 2013-142228 | 7/2013 |
| JP | 2014-025272 | 2/2014 |
| JP | 2014-074315 | 4/2014 |
| JP | 2014-074319 | 4/2014 |
| JP | 2014-098270 | 5/2014 |
| JP | 2014-129676 | 7/2014 |
| JP | 2014-148893 | 8/2014 |
| JP | 5572770 | 8/2014 |
| JP | 2014-205955 | 10/2014 |
| WO | 2012/157438 | 11/2012 |
| WO | 2014/123228 | 8/2014 |

\* cited by examiner

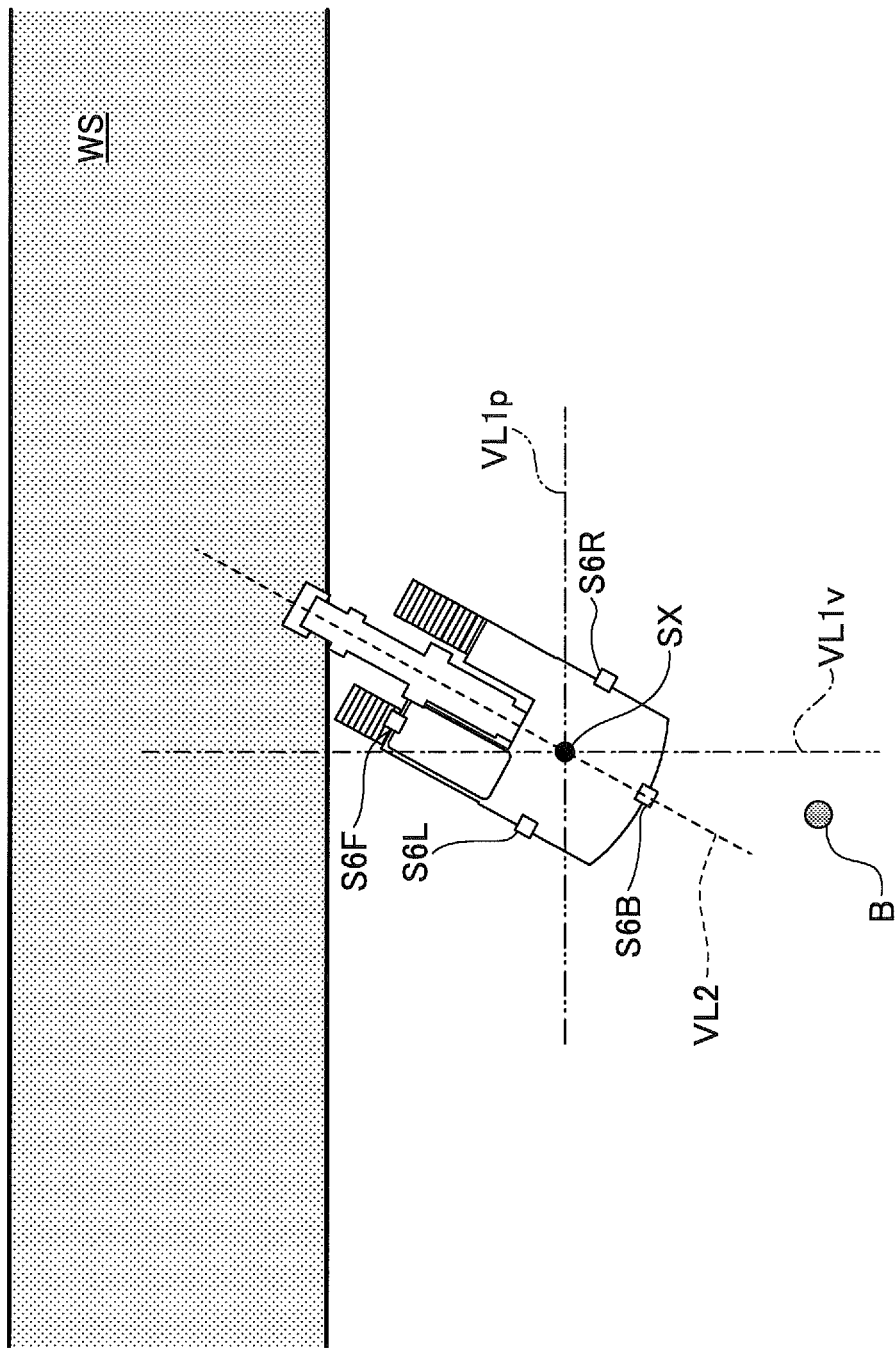

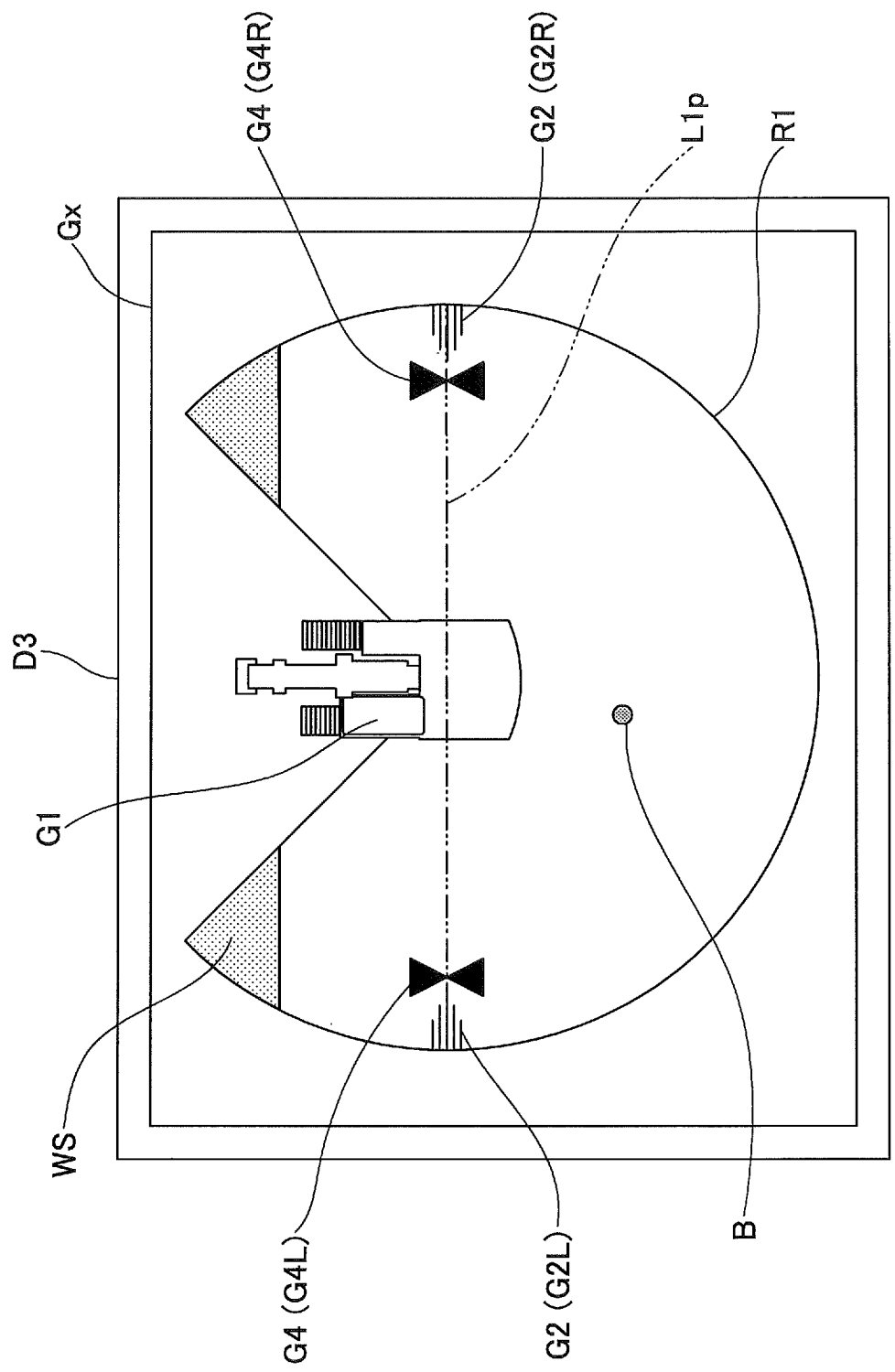

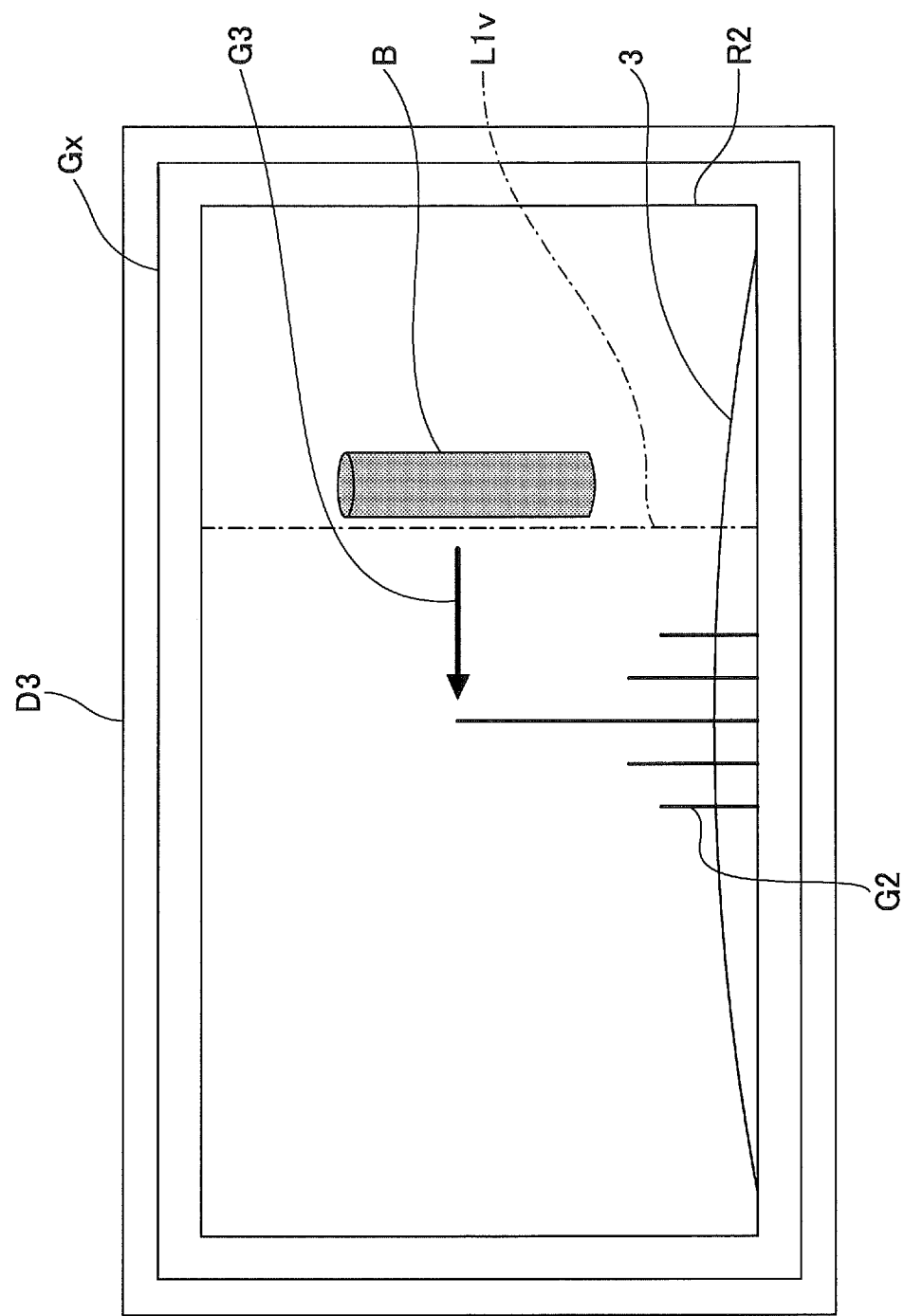

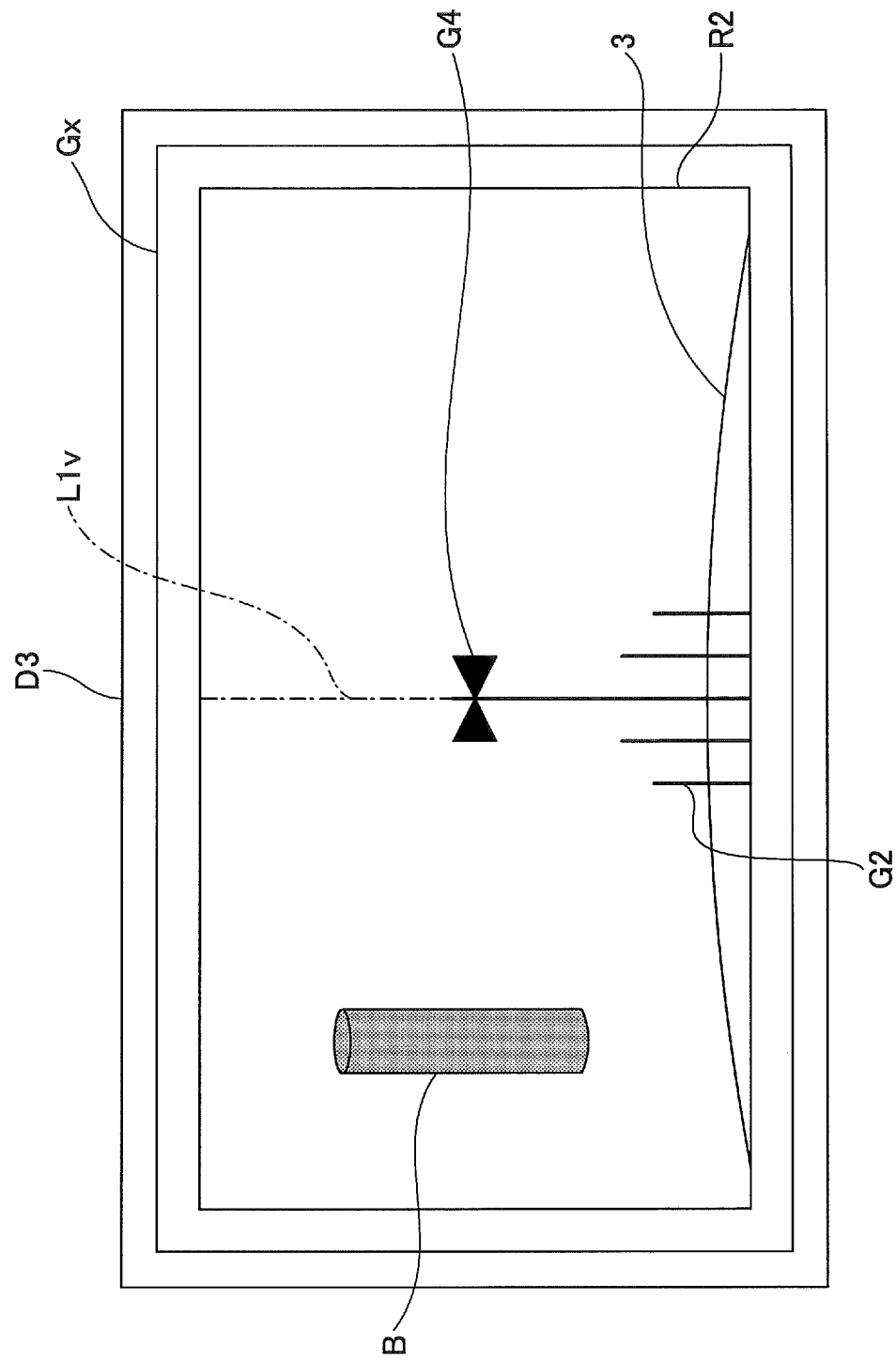

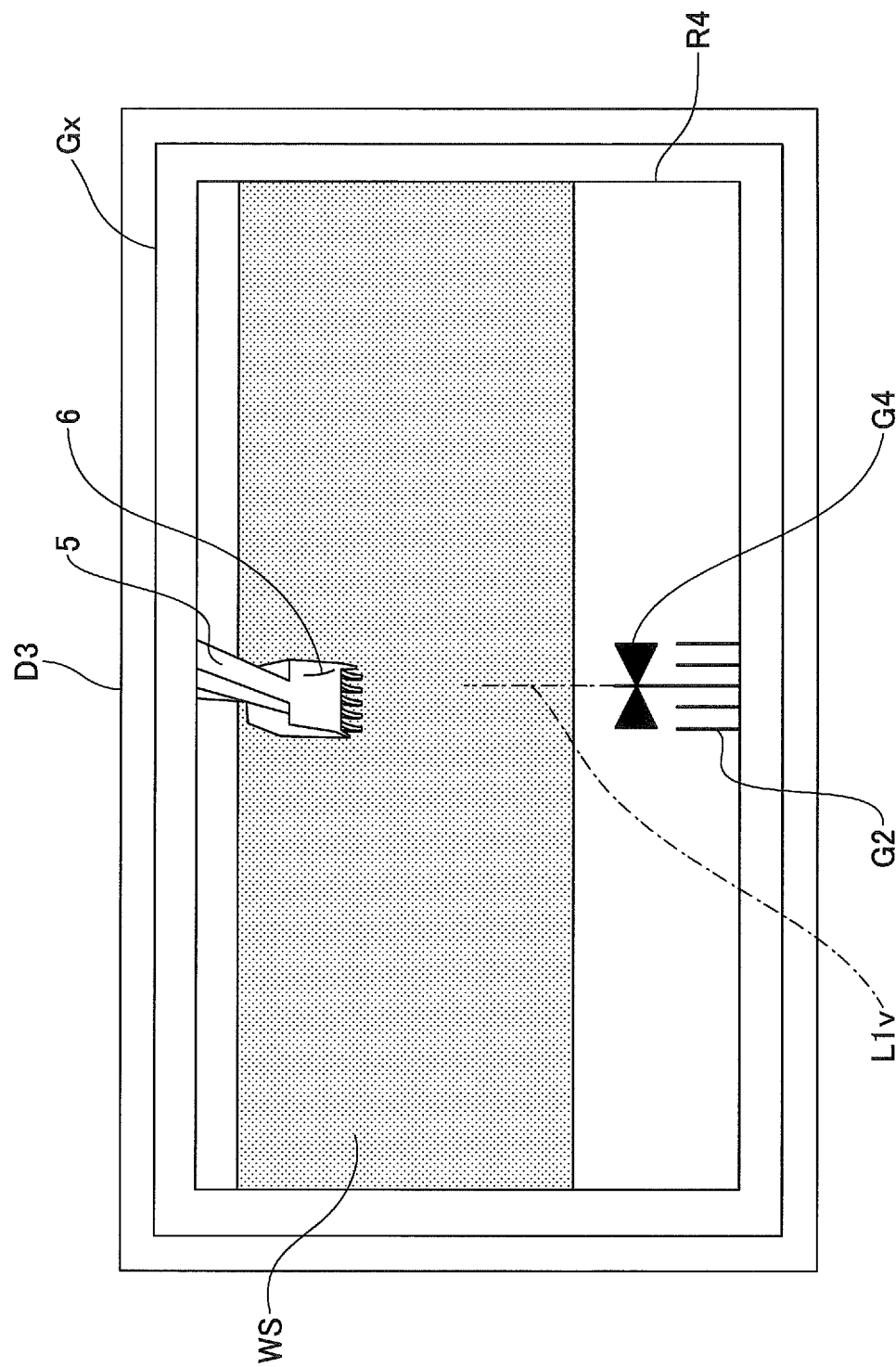

SHOVEL

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/073380 filed on Aug. 9, 2016, designating the U.S., which claims priority based on Japanese Patent Application No. 2015-158332 filed on Aug. 10, 2015. The entire contents of each of the foregoing applications are incorporated herein by reference.

BACKGROUND

Technical Field

The present disclosure relates to a shovel provided with a machine guidance function.

Description of Related Art

In order to efficiently and precisely perform work such as excavation by an attachment, skilled operation techniques are required for an operator of a shovel as a construction machine. For this reason, there is a shovel provided with a function for guiding an operation of the shovel (which is referred to as machine guidance), so that even an operator with less shovel operation experiences can perform work efficiently and precisely.

Specifically, the shovel of Patent Document 1 is provided with a display system that displays an image indicating a line segment illustrating a cross-section of a slope surface of a work target and a position of an edge of a bucket. Then, the display system displays a confronting compass that is an icon indicating a normal facing direction to the slope surface and a direction in which the shovel is to be turned, as information for causing the shovel to normally face the slope surface.

The display system of Patent Document 1, however, only displays a confronting compass on a computer image of a designed landform represented by a plurality of triangular polygons, as an icon that is completely independent from displayed content of the computer image. As a result, an operator who views the confronting compass may not be able to intuitively understand an operation to be performed so as to normally face the shovel to a slope surface.

In view of the above, it is desirable to provide a shovel with which an operator can intuitively understand an operation to be performed so as to normally face a shovel to a work target surface, such as a slope surface.

SUMMARY

According to an aspect of the present disclosure, there is provided a shovel including a lower travelling body; an upper turning body pivotably attached to the lower traveling body; a camera attached to the upper turning body; a processor; and a memory that includes instructions, which when executed, cause the processor to execute the following steps: generating an output image including a camera image captured by the camera; and displaying an image representing an extending direction of a work target surface or a direction orthogonal to the extending direction and the camera image while superposing the image on the camera image.

BRIEF DESCRIPTION OF THE DRAWINGS

FIG. 4 is a top view of the shovel that forms a slope surface;

FIG. 5B is a diagram illustrating an example of the output image;

FIG. 6A is a diagram illustrating an example of the output image;

FIG. 6B is a diagram illustrating an example of the output image;

FIG. 8B is a diagram illustrating an example of the output image; and

DETAILED DESCRIPTION

Figure 1:
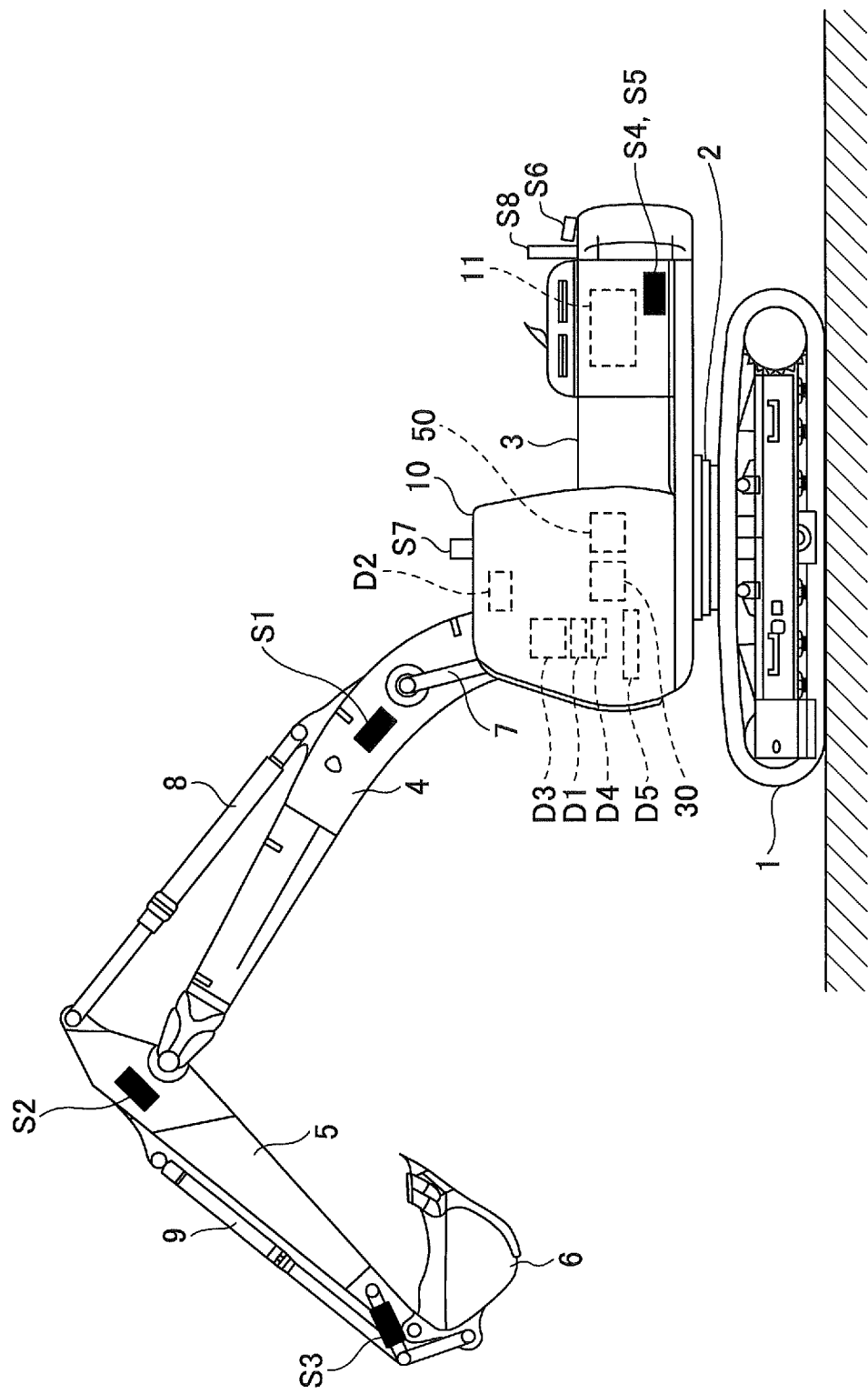
FIG. 1 is a side view of a shovel according to an embodiment.

FIG. 1 is a side view of a shovel (excavator) according to an embodiment of the present disclosure. An upper turning body 3 is pivotably mounted on a lower travelling body 1 of the shovel through a turning mechanism 2. A boom 4 is attached to the upper turning body 3. An arm 5 is attached to an edge of the boom 4, and a bucket 6 is attached to an end of the arm 5 as an end attachment. As an end attachment, a bucket for a slope, a dredging bucket, etc., may be used.

The boom 4, the arm 5, and the bucket 6 form a back-hoe attachment as an example of an attachment, and are hydraulically driven by a boom cylinder 7, an arm cylinder 8, and a bucket cylinder 9, respectively. A boom angle sensor S1 is attached to the boom 4, an arm angle sensor S2 is attached to the arm 5, and a bucket angle sensor S3 is attached to the bucket 6. A bucket tilt mechanism may be provided to the back-hoe attachment.

The boom angle sensor S1 detects a rotation angle of the boom 4. In the embodiment, the boom angle sensor S1 is an acceleration sensor for detecting a rotation angle of the boom 4 with respect to the upper turning body 3 by detecting a tilt with respect to the horizontal plane.

The arm angle sensor S2 detects a rotation angle of the arm 5. In the embodiment, the arm angle sensor S2 is an acceleration sensor for detecting a rotation angle of the arm 5 with respect to the boom 4 by detecting a tilt with respect to the horizontal plane.

The bucket angle sensor S3 detects a rotation angle of the bucket 6. In the embodiment, the bucket angle sensor S3 is an acceleration sensor for detecting a rotation angle of the bucket 6 with respect to the arm 5 by detecting a tilt with respect to the horizontal plane. When the back-hoe attachment is provided with the bucket tilt mechanism, the bucket angle sensor S3 additionally detects a rotational angle of the bucket 6 around a tilt axis.

Each of the boom angle sensor S1, the arm angle sensor S2, and the bucket angle sensor S3 may be a potentiometer using variable resistor, a stroke sensor for detecting a stroke amount of the corresponding hydraulic cylinder, a rotary encoder for detecting a rotation angle around a connecting pin, etc.

In the upper turning body 3, a cabin 10 is provided and a power source is installed, such as an engine 11. A body tilt sensor S4, a turning angular velocity sensor S5, and a camera S6 are attached to the upper turning body 3. A communication device S7 and a positioning device S8 may be attached.

The body tilt sensor S4 detects a tilt of the upper turning body 3 with respect to the horizontal plane. In the embodiment, the body tilt sensor S4 is a two-axis acceleration sensor for detecting a tilt angle around a front-rear axis and a tilt angle around a left-right axis of the upper turning body 3. The front-rear axis and the left-right axis of the upper turning body 3 are, for example, orthogonal to each other and pass through a shovel center point, which is a point on a turning axis.

The turning angular velocity sensor S5 is, for example, a gyrosensor, and detects a turning angular velocity of the upper turning body 3. The turning angular velocity sensor S5 may be a resolver, a rotary encoder, and so forth.

The camera S6 is a device capable for capturing an image in the vicinity of the shovel. In the embodiment, the camera S6 is one or more cameras attached to the upper turning body 3.

The communication device S7 is a device for controlling communication between the shovel and the outside. The communication device S7 controls, for example, radio communication between a GNSS (Global Navigation Satellite System) positioning system and the shovel. By using the communication device S7, the shovel can obtain design data including information about a target formation level, etc., through radio communication. Alternatively, the shovel may obtain the design data using a semiconductor memory, etc.

The positioning device S8 is a device for measuring a position and an orientation of the shovel. In the embodiment, the positioning device SB is a GNSS receiver in which an electronic compass is embedded, and measures latitude, longitude, and altitude of the existing position of the shovel and an orientation of the shovel.

Inside the cabin 10, an input device D1, an audio output device D2, a display device D3, a storage device D4, a gate lock lever D5, a controller 30, and a machine guidance device 50 are installed.

The controller 30 functions as a main controller for executing drive control of the shovel. In the embodiment, the controller 30 is formed of a processor including a CPU and an internal memory. Various types of functions of the controller 30 are implemented by the CPU by executing a program stored in the internal memory.

The machine guidance device 50 is for guiding an operation of the shovel. In the embodiment, the machine guidance device 50, for example, visually and aurally informs an operator of a vertical distance between a target formation level set up by the operator and a position of a front edge (tip) of the bucket 6. By doing this, the machine guidance device 50 guides an operation of the shovel by the operator. The machine guidance device 50 may inform the operator of the distance only visually or only aurally. Specifically, the machine guidance device 50 may be formed of a processor including a CPU and an internal memory, similar to the controller 30. Various types of functions of the machine guidance device 50 are implemented by the CPU by executing a program stored in the internal memory. The machine guidance device 50 may be provided separately from the controller 30, or may be embedded in the controller 30.

The input device D1 is a device for an operator of the shovel to input various types of information into the machine guidance device 50. In the embodiment, the input device D1 is membrane switches attached to a part in the vicinity of the display device D3. A touch panel, etc., may be used as the input device D1.

The audio output device D2 outputs various types of audio information in response to an audio output command from the machine guidance device 50. In the embodiment, an in-vehicle speaker that is directly connected to the machine guidance device 50 is used as the audio output device D2. As the audio output device D2, an alarm device, such as a buzzer, may be used.

The display device D3 outputs various types of image information in response to a command from the machine guidance device 50. In the embodiment, an in-vehicle liquid crystal display that is directly connected to the machine guidance device 50 is used as the display device D3. A camera image is displayed on the display device D3.

The storage device D4 is a device for storing various types of information. In the embodiment, a non-volatile storage medium, such as a semiconductor memory, is used as the storage device D4. The storage device D4 stores various types of information to be output by the machine guidance device 50, etc.

The gate lock lever D5 is a mechanism for preventing the shovel from being erroneously operated. In the embodiment, the gate lock lever D5 is installed between a door of the cabin 10 and a driver's seat. When the gate lock lever D5 is pulled up so that an operator is prevented from exiting from the cabin 10, various types of operation devices become operable. In contrast, when the gate lock lever D5 is pushed down so that an operator can exit from the cabin 10, the various types of operation devices becomes inoperable.

Figure 2:
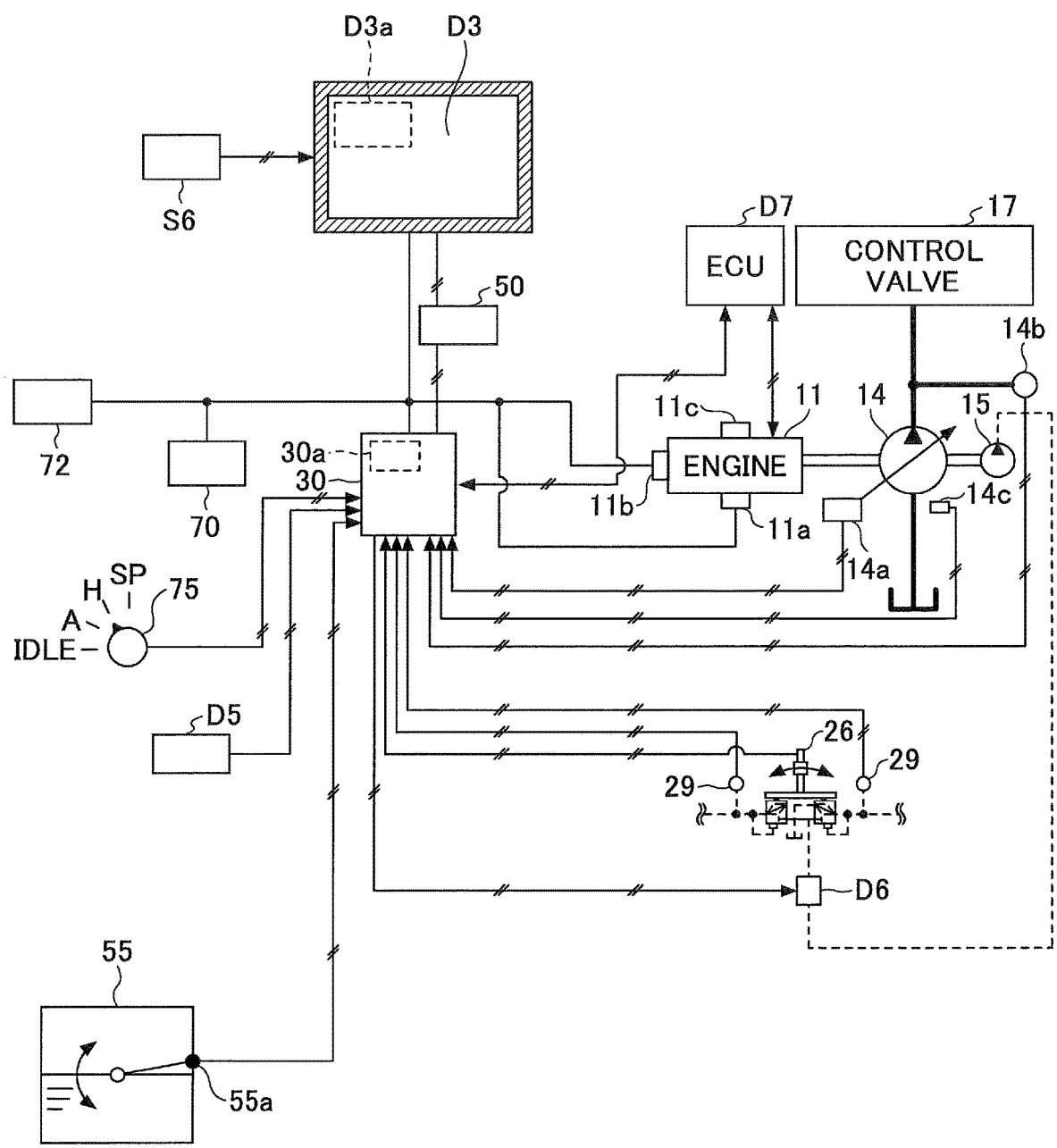
FIG. 2 is a diagram illustrating a configuration of a drive system of the shovel of FIG. 1.

FIG. 2 is a diagram illustrating an example of a configuration of a drive system of the shovel of FIG. 1. In FIG. 2, a mechanical drive system is indicated by a double line, a high pressure hydraulic line is indicated by a thick solid line, a pilot line is indicated by a dashed line, and an electronic drive/control system is indicated by a thin solid line.

An engine 11 is a power source of the shovel. In the embodiment, engine 11 is a diesel engine that adopts isochronous control such that a number of revolutions of the engine is kept constant regardless of an increase or a decrease in an engine load. In the engine 11, a fuel injection amount, a fuel injection timing, boost pressure, and so forth are controlled by an engine controller unit (ECU) D7.

A main pump 14 and a pilot pump 15 are connected to the engine 11 as hydraulic pumps. A control valve 17 is connected to the main pump 14 through a high pressure hydraulic line.

The control valve 17 is a hydraulic control device for controlling a hydraulic system of the shovel. Hydraulic actuators, such as a right traveling hydraulic motor, a left traveling hydraulic motor, the boom cylinder 7, the arm cylinder 8, the bucket cylinder 9, and a turning hydraulic motor, are connected to the control valve 17 through the high pressure hydraulic line. The turning hydraulic motor may be a turning motor generator.

An operation device 26 is connected to the pilot pump 15 through a pilot line. The operation device 26 includes a lever and a pedal. The operation device 26 is connected to the control valve 17 through a hydraulic line and a gate lock valve D6.

The gate lock valve D6 is for switching communicating/blocking of the hydraulic line that connects the control valve 17 to the operation device 26. In the embodiment, the gate lock valve D6 is an electromagnetic valve for switching communicating/blocking of the hydraulic line in response to a command from the controller 30. The controller 30 determines a state of the gate lock lever D5 based on a state signal output by the gate lock lever D5. Then, upon determining that the gate lock lever D5 is in a pulled-up state, the controller 30 outputs a communication command to the gate lock valve D6. In response to receiving the communication command, the gate lock valve D6 opens to communicate the hydraulic line. As a result, an operation on the operation device 26 by an operator becomes effective. In contrast, upon determining that the gate lock lever D5 is in a pulled-down state, the controller 30 outputs a blocking command to the gate lock valve D6. In response to receiving the blocking command, the gate lock valve D6 closes to block the hydraulic line. As a result, an operation on the operation device 26 by an operator becomes ineffective.

A pressure sensor 29 detects details of an operation on the operation device 26 in a form of pressure. The pressure sensor 29 outputs a detection value to the controller 30.

FIG. 2 illustrates relation of connection between the controller 30 and the display device D3. In the embodiment, the display device D3 is connected to the controller 30 through the machine guidance device 50. The display device D3, the machine guidance device 50, and the controller 30 may be connected through a communication network, such as CAN, or may be connected through a dedicated line.

The display device D3 includes a conversion processor D3a for generating an image. In the embodiment, the conversion processor D3a generates a camera image to be displayed based on an output of the camera S6. Accordingly, the camera S6 may be connected to the display device D3, for example, through a dedicated line.

The conversion processor D3a generates an image to be displayed based on an output of the controller 30 or the machine guidance device 50. In the embodiment, the conversion processor D3a converts various types of information output by the controller 30 or the machine guidance device 50 into image signals. The information output by the controller 30 includes, for example, data indicating a temperature of engine cooling water, data indicating a temperature of a hydraulic oil, data indicating a residual amount of fuel, and so forth. The information output by the machine guidance device 50 includes, data indicating a position of a front end (tip) of the bucket 6, data indicating an orientation of a sloop that is a work target, data indicating an orientation of the shovel, data indicating an operation direction for causing the shovel to normally face a slope, and so forth.

The conversion processor D3a may be implemented as a function of the controller 30 or the machine guidance device 50, instead of the function of the display device D3. In this case, the camera S6 is connected to the controller 30 or the machine guidance device 50, instead of the display device D3.

The display device D3 receives supply of electric power from a storage battery 70 to operate. The storage battery 70 is charged by electric power generated by an alternator 11a (generator) of the engine 11. Electric power of the storage battery 70 is supplied, in addition to the controller 30 and the display device D3, to an electrical component 72, etc., of the shovel. A starter 11b of the engine 11 is driven by electric power from the storage battery 70 to start the engine 11.

The engine 11 is controlled by the engine controller unit D7. From the engine controller unit D7, various types of date indicating a state of the engine 11 (e.g., data indicating cooling water temperatures (physical quantity) detected by a water temperature sensor 11c) are constantly transmitted to the controller 30. Accordingly, the controller 30 stores the data in a temporary storage unit (memory) 30a, and can transmit the data to the display device D3 if necessary.

As described below, various types of data are supplied to the controller 30. The various types of data are stored in the temporary storage unit 30a of the controller 30.

First, data indicating a swash plate inclination angle is supplied from a regulator 14a of the main pump 14, which is a variable capacity hydraulic pump, to the controller 30. Data indicating discharge pressure of the main pump 14 is transmitted from a discharge pressure sensor 14b to the controller 30. These data elements (data elements indicating physical quantities) are stored in the temporary storage unit 30a. An oil temperature sensor 14c is provided in a pipeline between a tank, in which hydraulic oil to be suctioned by the main pump 14 is stored, and the main pump 14. Data representing a temperature of the hydraulic oil flowing through the pipeline is supplied from the oil temperature sensor 14c to the controller 30.

Data indicating a fuel storage amount is supplied from a fuel storage amount detector 55a in a fuel container 55 to the controller 30. In the embodiment, data indicating a residual quantity state of the fuel is supplied from a fuel residual quantity sensor, as the fuel storage amount detector 55a in the fuel container 55, as a fuel tank, to the controller 30.

Specifically, the fuel residual quantity sensor is formed of a float that follows a liquid surface; and a variable resister (potentiometer) that converts a vertical fluctuation amount of the float into a resistance value. With this configuration, the fuel residual quantity sensor can cause the display device D3 to continuously display the residual quantity state of the fuel. The detection method of the fuel storage amount detector 55a may be suitably selected depending on an operating environment, etc., and a detection method may be adopted with which the residual quantity state of the fuel can be displayed in a step wise-manner.

The pilot pressure transmitted, upon the operation device 26 being operated, to the control valve 17 is detected by the pressure sensor 29. The pressure sensor 29 supplies data indicating the detected pilot pressure to the controller 30.

According to the embodiment, as illustrated in FIG. 2, the shovel includes an engine speed adjustment dial 75 located in the cabin 10. The engine speed adjustment dial 75 is a dial for adjusting a number of revolutions of the engine 11, and in the embodiment, the number of revolutions of the engine can be switched in four steps. From the engine speed adjustment dial 75, data indicating a setup state of the number of revolutions of the engine is constantly transmitted to the controller 30. The engine speed adjustment dial 75 can switch the number of revolutions of the engine in four steps, which are an SP mode, an H mode, an A mode, and an idling mode. FIG. 2 depicts a state in which the H mode is selected in the engine speed adjustment dial 75.

The SP mode is a revolution number mode to be selected when an amount of work is to be prioritized, and the SP mode utilizes the largest number of revolutions of the engine. The H mode is a revolution number mode to be selected when both the amount of the work and the fuel efficiency are to be prioritized, and the H mode utilizes the second largest number of revolutions of the engine. The A mode is a revolution number mode to be selected when the shovel is to be operated with a low noise level while prioritizing the fuel efficiency, and the A mode utilizes the third largest number of revolutions of the engine. The idling mode is a revolution number mode to be selected when the engine 11 is to be in an idling state, and the idling mode utilizes the smallest number of revolutions of the engine. Then, the number of revolutions of the engine 11 is controlled to be constant at the number of revolutions of the engine of the revolution number mode selected by the engine speed adjustment dial 75.

Figure 3:
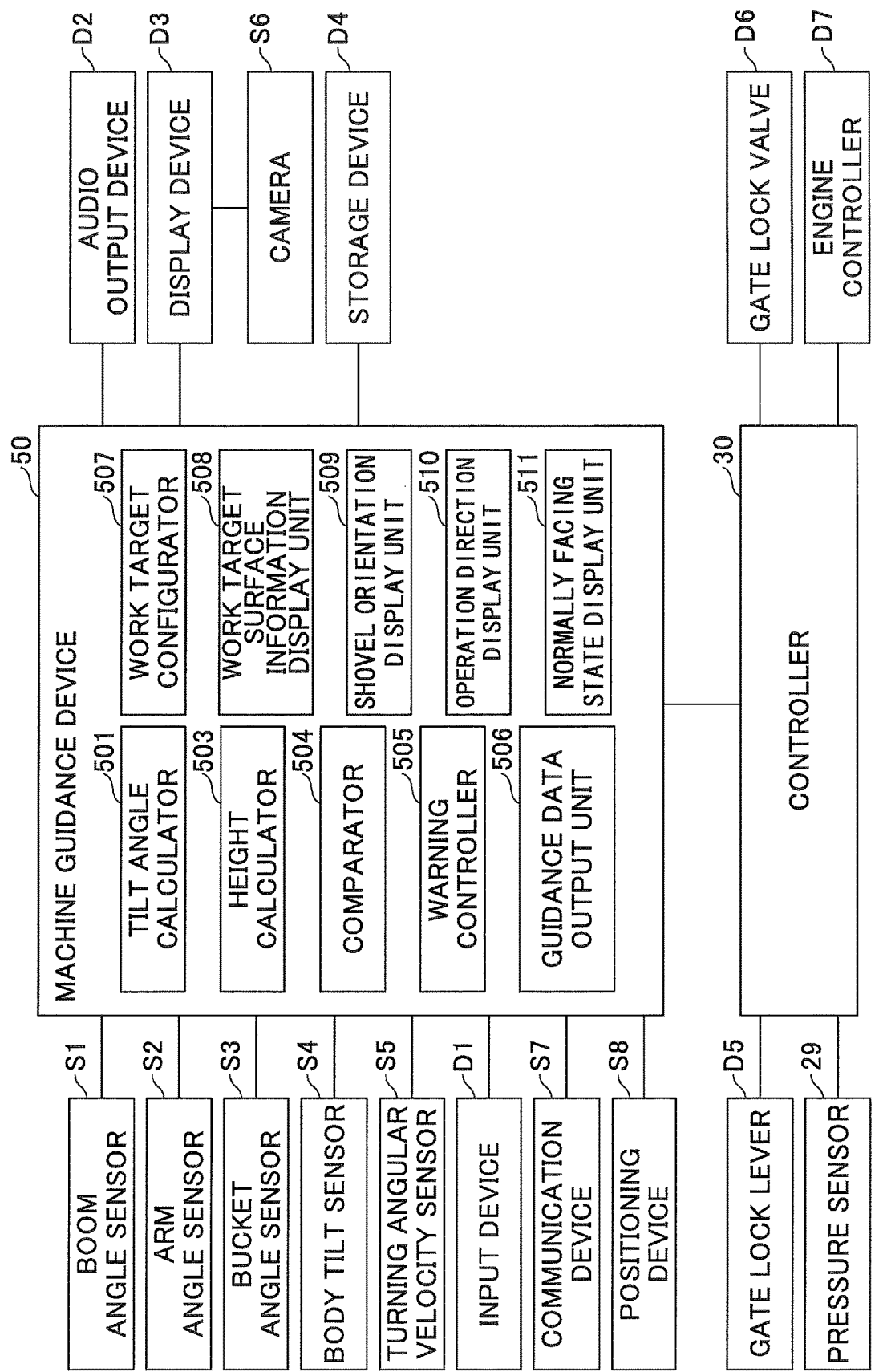
FIG. 3 is a block diagram illustrating an example of a configuration of a machine guidance device.

Next, various types of functional elements of the machine guidance device 50 are described by referring to FIG. 3. FIG. 3 is a functional block diagram illustrating an example of a configuration of the machine guidance device 50.

In the embodiment, the controller 30 controls whether guidance by the machine guidance device 50 is to be executed, in addition to control of the overall operation of the shovel. Specifically, the controller 30 controls whether the guidance by the machine guidance device 50 is to be executed based on a state of the gate lock lever D5, a detection signal from the pressure sensor 29, etc.

Next, the machine guidance device 50 is described. In the embodiment, the machine guidance device 50 receives various types of signals and data output from, for example, the boom angle sensor S1, the arm angle sensor S2, the bucket angle sensor S3, the body tilt sensor S4, the turning angular velocity sensor S5, the input device D1, and the controller 30. Then, the machine guidance device 50 calculates an actual position of an attachment (e.g., the bucket 6) based on the received signals and data. Then, upon detecting that the actual position of the attachment is different from a target position, the machine guidance device 50 transmits a warning command to the audio output device D2 and the display device D3 to announce the warning.

The machine guidance device 50 includes a functional unit that implements various functions. In the embodiment, the machine guidance device 50 includes, as the functional units for guiding operations of the attachments, a tilt angle calculator 501; a height calculator 503; a comparator 504; a warning controller 505; a guidance data output unit 506; a work target configurator 507; a work target surface information display unit 508; a shovel orientation display unit 509; an operation direction display unit 510; and a normally facing state display unit 511.

The tilt angle calculator 501 calculates a tilt angle of the upper turning body 3 (tilt angle of the shovel) with respect to the horizontal plane based on a detection signal from the body tilt sensor S4. Namely, the tilt angle calculator 501 calculates a tilt angle of the shovel using the detection signal from the body tilt sensor S4.

The height calculator 503 calculates the height of the front end (tip) of the bucket 6 from the tilt angle calculated by the tilt angle calculator 501 and angles of the boom 4, the arm 5, and the bucket 6 calculated from the detection signals from the sensors S1 through S3. In the embodiment, excavation is performed with the front end of the bucket 6. Accordingly, the front end (tip) of the bucket 6 corresponds to the operating part of the end attachment. However, when a work is performed, such as smoothing sediment with a back face of the bucket 6, the back face of the bucket 6 corresponds to the operating part of the end attachment. When a breaker is used as the end attachment other than the bucket 6, the front end of the breaker corresponds to the operating part of the end attachment.

The comparator 504 compares the height of the front end (tip) of the bucket 6 calculated by the height calculator 503 with a target height of the front end (tip) of the bucket 6 indicated by guidance data to be output from the guidance data output unit 506. The target height may be calculated from previously input guidance data, and a current position and a working posture of the shovel. The target height may be calculated from a past tip position of the shovel that was established, an input target depth, the tilt angle of the shovel, and a current working posture (current tip position).

Upon determining that a warning is required based on the comparison result by the comparator 504, the warning controller 505 transmits a warning command to one of or both the audio output device D2 and the display device D3. Upon receiving the warning command, the audio output device D2 and the display device D3 output a predetermined warning to inform an operator of the shovel of the predetermined warning.

The guidance data output unit 506 extracts target height data of the bucket 6 from the guidance data previously stored in a storage unit of the machine guidance device 50 to output the target height data to the comparator 504. At this time, the guidance data output unit 506 may output target height data of the bucket 6 corresponding to the current position, the working posture, the tilt angle, and so forth of the shovel.

The work target configurator 507 is a functional element for configuring a work target of the shovel. For example, the work target configurator 507 sets an orientation of the shovel to be a direction in which the shovel normally facing a slope surface as the work target at a time at which a predetermined switch of the input device D1 is pressed. For two-dimensional machine guidance, the work target configurator 507 may configure a position of a front edge (tip) of the bucket 6 to be a reference position at a time at which a predetermined switch of the input device D1 is pressed. The reference position is used to calculate and display a current position of the front edge of the bucket 6.

When the shovel is provided with design data and the positioning device S8, the work target configurator 507 configures, in advance, a direction in which the shovel normally facing a slope surface.

The work target surface information display unit 508 is a functional element for displaying information about a slope surface as a work target surface while superposing the information on a camera image. For example, the work target surface information display unit 508 displays an image representing an extending direction of a slope surface as a work target surface or a direction orthogonal to the extending direction while superposing the image on a camera image generated by the display device D3. The image representing the extending direction of the slope surface or the direction orthogonal to the extending direction includes a line segment indicating the extending direction of the slope surface, a line segment indicating a direction orthogonal to the extending direction, etc. The work target surface is not limited to the slope surface.

The shovel orientation display unit 509 is a functional element for displaying information about an orientation of the shovel on an output image. For example, the shovel orientation display unit 509 displays an image representing an orientation of the shovel while superposing the image on a camera image generated by the display device D3. The image representing the orientation of the shovel includes a line segment indicating the orientation of the shovel. The shovel orientation display unit 509 may display an image representing an orientation of the shovel at a part of an output image other than a camera image.

The operation direction display unit 510 is a functional element for displaying, on an output image, an image representing an operation direction for normally facing the shovel to a slope surface as the work target. For example, the operation direction display unit 510 displays an arrow indicating the operation direction for normally facing the shovel to the slope surface while superposing the arrow on the camera image. The operation direction display unit 510 may display an image representing the operation direction for normally facing the shovel to the slope surface at a part of an output image other than a camera image. The operation direction may include a turning direction or a traveling direction.

The normally facing state display unit 511 is a functional element for displaying, on an output image, an image representing a state in which the shovel normally faces a slope surface as the work target. For example, the normally facing state display unit 511 displays a normally facing mark representing the state in which the shovel normally faces the slope surface, while superposing the normally facing mark on a camera image.

Figure 5A:
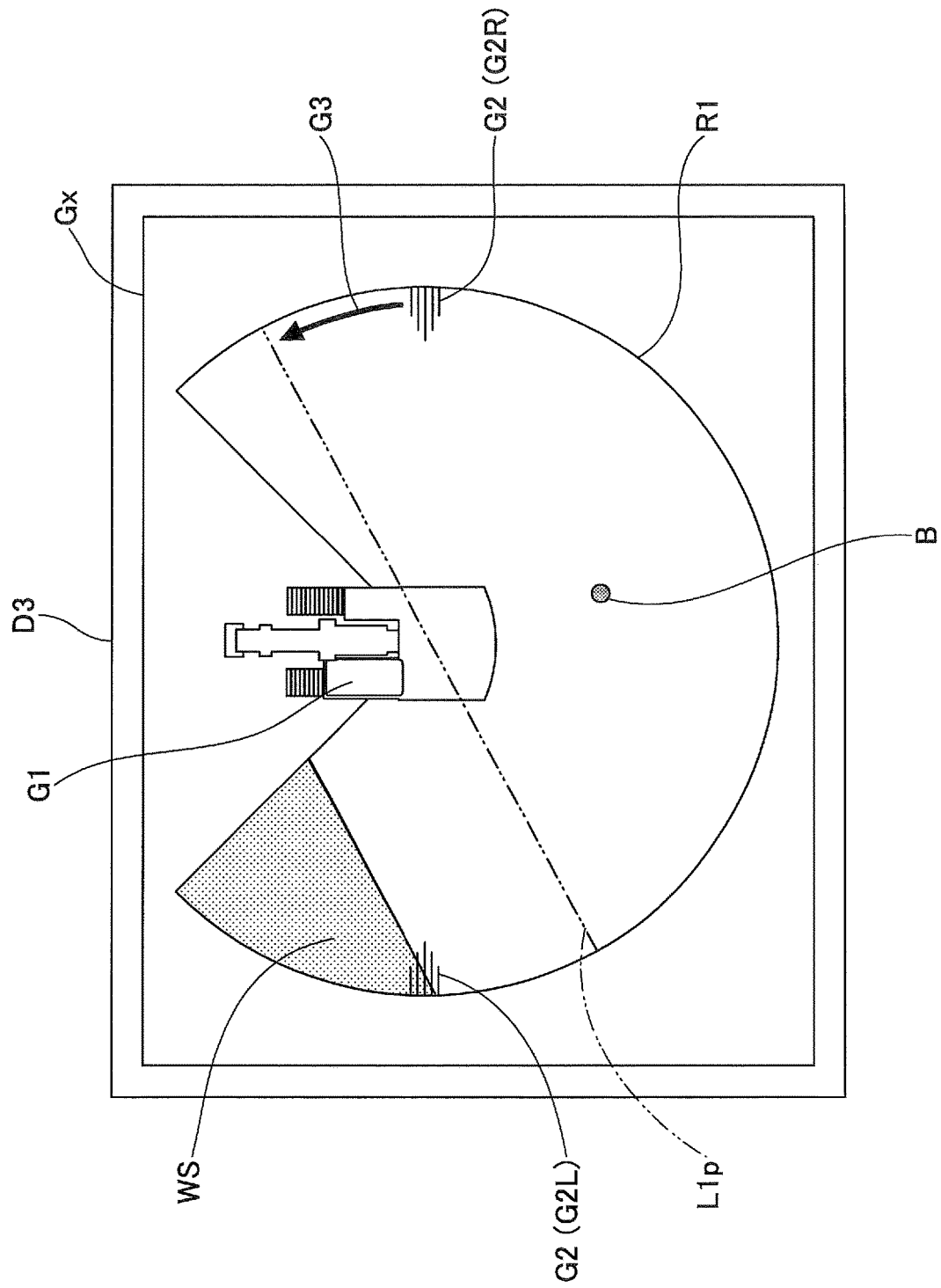
FIG. 5A is a diagram illustrating an example of an output image.

Referring to FIG. 4, FIG. 5A, and FIG. 5B, an example of an output image is described that is displayed on the display device D3 when the machine guidance device 50 of FIG. 3 is used. FIG. 4 is a top view of the shovel that forms a slope surface WS. The slope surface WS is a slope surface as the work target that is configured by the work target configurator 507.

In the shovel of FIG. 4, a front camera S6F, a left side camera S6L, a right side camera S6R, and a rear camera S6B are installed in the upper turning body 3.

FIG. 4 shows that an object B exists in the right rear side of the shovel. The one dot chain line VL1v is a virtual line (a line segment that is depicted for the description and that does not actually exist) that is orthogonal to the extending direction of the slope surface WS and that passes through the center point SX of the shovel. The two dot chain line VL1p is a virtual line that is parallel to the extending direction of the slope surface WS and that passes through the center point SX of the shovel. The dashed line VL2 is a virtual line that is parallel to the front-rear direction of the shovel and that passes through the center point SX of the shovel.

FIG. 5A and FIG. 5B show output images Gx including fan-shaped top views, respectively, generated by the display device D3 based on the outputs of the left side camera S6L, the right side camera S6R, and the rear camera S6B, which are installed in the shovel of FIG. 4. Specifically, FIG. 5A shows the output image Gx at a time at which the shovel does not normally face the slope surface WS; and FIG. 5B shows the output image Gx at a time at which the shovel normally faces the slope surface WS.

In each of the output images Gx of FIG. 5A and FIG. 5B, a camera image (the fan-shaped overhead image) generated by the display device D3 is displayed inside the fan-shaped region R1, and a shovel icon G1, which is an illustration image representing a top view of the shovel, is arranged at the center of the fan-shaped region R1. As it can be seen by comparing FIG. 5A with FIG. 5B, the camera image displayed inside the fan-shaped region R1 varies in accordance with the turning operation of the shovel, for example. The state of the shovel of the camera image of FIG. 5B corresponds to a state obtained by turning the shovel illustrated in the camera image of FIG. 5A in the left direction. The same applies to FIG. 6A and FIG. 6B, FIG. 7A and FIG. 7B, and FIG. 8A and FIG. 8B, which are described below.

The two dot chain line L1p is an example of an image representing the extending direction of the slope surface WS, and the two dot chain line L1p corresponds to the two dot chain line VL1p of FIG. 4. By the work target surface information display unit 508, at least a part of the two dot chain line L1p is superposed onto and displayed on a camera image. In the embodiment, the two dot chain line L1p passes through the center of the fan-shaped region R1, and the two dot chain line L1p has a length that is equal to a diameter of the fan-shaped region R1. However, the two dot chain line L1p may not pass through the center of the fan-shaped region R1. The length of the two dot chain line L1p may not be equal to the diameter of the fan-shaped region R1. For example, the two-dot chain line L1p may protrude from the fan-shaped region R1.

A scale G2 is an example of an image representing an orientation of the shovel. In the embodiment, the scale G2 includes a left side scale G2L that is arranged at a left end of the fan-shaped region R1 and a right side scale G2R that is arranged at a right end of the fan-shaped region R1. Each of the left side scale G2L and the right side scale G2R is formed of five line segments, and a main scale that is a longest line segment at the center corresponds to the left-right axis of the upper turning body 3. The scale G2 is displayed on the output image Gx by the shovel orientation display unit 509. The scale G2 may be displayed outside the fan-shaped region R1.

The arrow G3 of FIG. 5A is an example of an image representing an operation direction for normally facing the shovel to the slope surface WS. In the embodiment, the arrow G3 extends along an outer periphery of the fan-shaped region R1 from the right side scale G2R to the two dot chain line L1p. Upon viewing the arrow G3, an operator of the shovel can intuitively find that the shovel can be normally faced to the slope surface WS by turning the upper turning body 3 to the left. For example, an operator can intuitively find that, by turning the upper turning body 3 to the left direction by the turning operation, or by turning the lower traveling body 1 to the left direction by the traveling operation, the shovel can be normally faced to the slope surface WS. The arrow G3 is displayed on the output image Gx by the operation direction display unit 510. The arrow G3 may be displayed outside the fan-shaped region R1. The arrow G3 may be blinked.

The normally facing mark G4 of FIG. 5B is an example of an image representing that the shovel normally faces the slope surface WS. In the embodiment, the normally facing mark G4 includes a left side normally facing mark G4L that is arranged close to the left side scale G2L; and a right side normally facing mark G4R that is arranged close to the right side scale G2R. Each of the left side normally facing mark G4L and the right side normally facing mark G4R is formed of two triangles, and the two triangles are arranged so that vertices of the two triangles facing each other nip the two dot chain line L1p. At this time, the two dot chain line L1p is parallel to and matches the main scale of each of the left side scale G2L and the right side scale G2R. The arrow G3 is deleted. Upon viewing the normally facing mark G4, an operator of the shovel can intuitively find that the shovel normally faces the slope surface WS. The normally facing mark G4 is displayed on the output image Gx by the normally facing state display unit 511. The normally facing mark G4 may be displayed outside the fan-shaped region R1. The normally facing mark G4 may be blinked.

Next, referring to FIG. 6A and FIG. 6B, another example of the output image is described that is displayed on the display device D3 when the machine guidance device 50 of FIG. 3 is used.

Each of FIG. 6A and FIG. 6B shows an output image Gx including a rearview image generated by the display device D3 based on the output of the rear camera S63, which is installed in the shovel of FIG. 4. Specifically, FIG. 6A shows the output image Gx when the shovel does not normally face the slope surface WS; and FIG. 6B shows the output image Gx when the shovel normally faces the slope surface WS.

In each of the output images Gx of FIG. 6A and FIG. 6B, a camera image (rearview image) generated by the display device D3 is displayed inside the rectangular region R2. An image displayed in the rearview image is a mirror image, similar to an image reflected on a rearview mirror. Accordingly, as illustrated in FIG. 4, the object B that is actually located at the right rear side of the shovel is displayed in the right side part of the rectangular region R2, as illustrated in FIG. 6A.

The one dot chain line L1v is an example of an image representing a direction orthogonal to the extending direction of the slope surface WS, and the one dot chain line L1v corresponds to the one dot chain line VL1v of FIG. 4. By the work target surface information display unit 508, at least a part of the one dot chain line L1v is superposed onto and displayed on a camera image. In the embodiment, the one dot chain line L1v is displayed so that the one dot chain line L1v is parallel to the vertical axis of the rectangular region R2, and the one dot chain line L1v has a length that is equal to the height of the rectangular region R2. However, the one dot chain line L1v may not be parallel to the vertical axis. The length of the one dot chain line L1v may not be equal to the height of the rectangular region R2. For example, the one dot chain line L1v may protrude from the rectangular region R2.

The scale G2 is an example of the image representing an orientation of the shovel. In the embodiment, the scale G2 is arranged at the center of the lower part of the rectangular region R2. The scale G2 is formed of five line segments, and a main scale that is a longest line segment at the center corresponds to the front-rear axis of the upper turning body 3. What is displayed at the lower end part of the rectangular region R2 is the rear end part of the upper turning body 3. The scale G2 is displayed on the output image Gx by the shovel orientation display unit 509. The scale G2 may be displayed outside the rectangular region R2.

The arrow G3 of FIG. 6A is an example of an image representing an operation direction for normally facing the shovel to the slope surface WS. In the embodiment, the arrow G3 extends parallel to the horizontal axis of the rectangular region R2 from the one dot chain line L1v to the scale G2. Upon viewing the arrow G3, an operator of the shovel can intuitively find that the shovel can be normally faced to the slope surface WS by turning the upper turning body 3 to the left. For example, an operator can intuitively find that, by turning the upper turning body 3 to the left direction by the turning operation, or by turning the lower traveling body 1 to the left direction by the traveling operation, the shovel can be normally faced to the slope surface WS. The arrow G3 is displayed on the output image Gx by the operation direction display unit 510. The arrow G3 may be displayed outside the rectangular region R1. The arrow G3 may be blinked.

The normally facing mark G4 of FIG. 6B is an example of an image representing that the shovel normally faces the slope surface WS. In the embodiment, the normally facing mark G4 is arranged at the position of the main scale of the scale G2. The normally facing mark G4 is formed of two triangles, and the two triangles are arranged so that vertices of the two triangles facing each other nip the main scale. At this time, the one dot chain line L1v matches the main scale. The arrow G3 is deleted. Upon viewing the normally facing mark G4, an operator of the shovel can intuitively find that the shovel normally faces the slope surface WS. The normally facing mark G4 is displayed on the output image Gx by the normally facing state display unit 511. The normally facing mark G4 may be displayed outside the rectangular region R2. The normally facing mark G4 may be blinked.

Figure 7A:
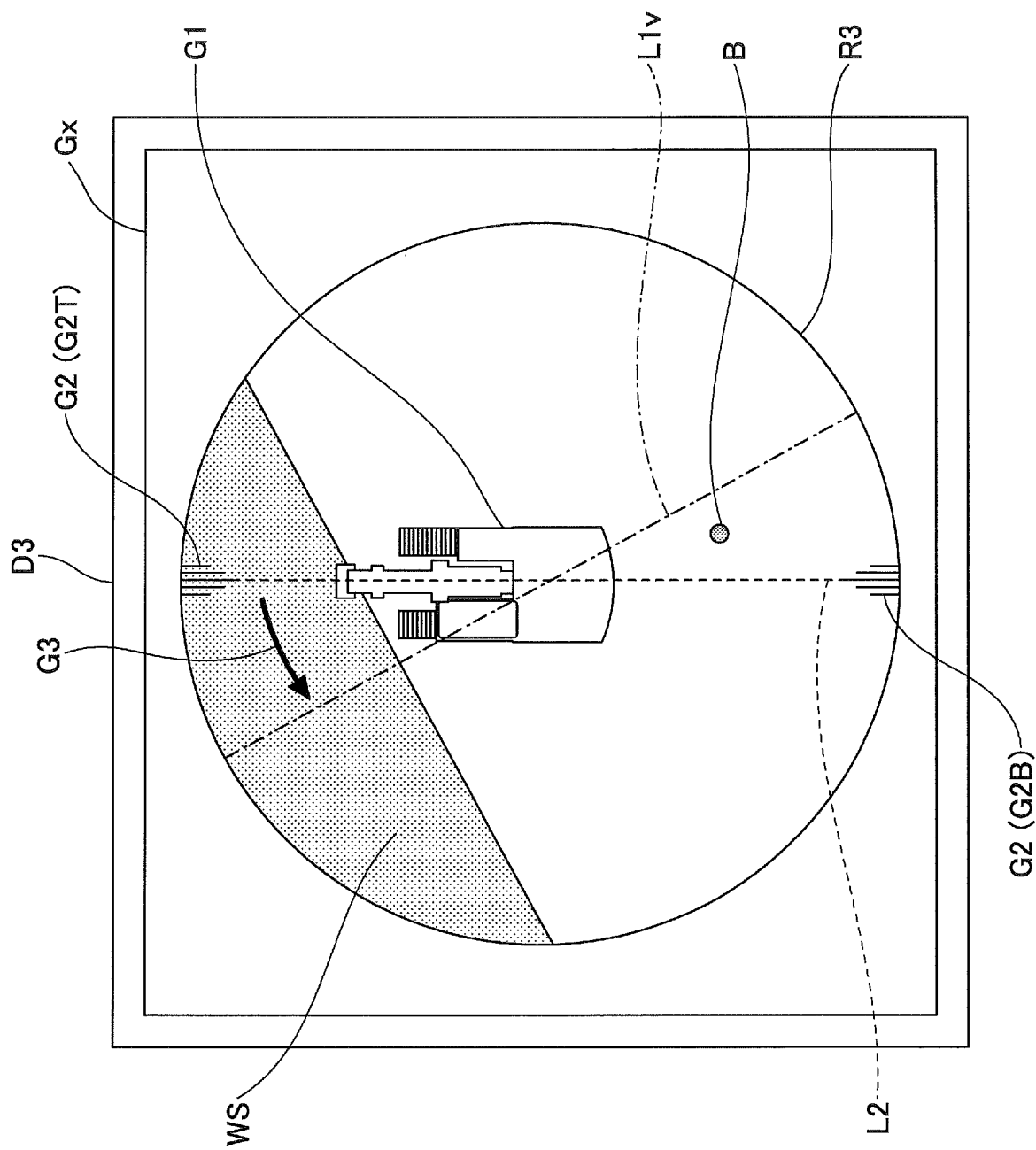
FIG. 7A is a diagram illustrating an example of the output image.
Figure 7B:
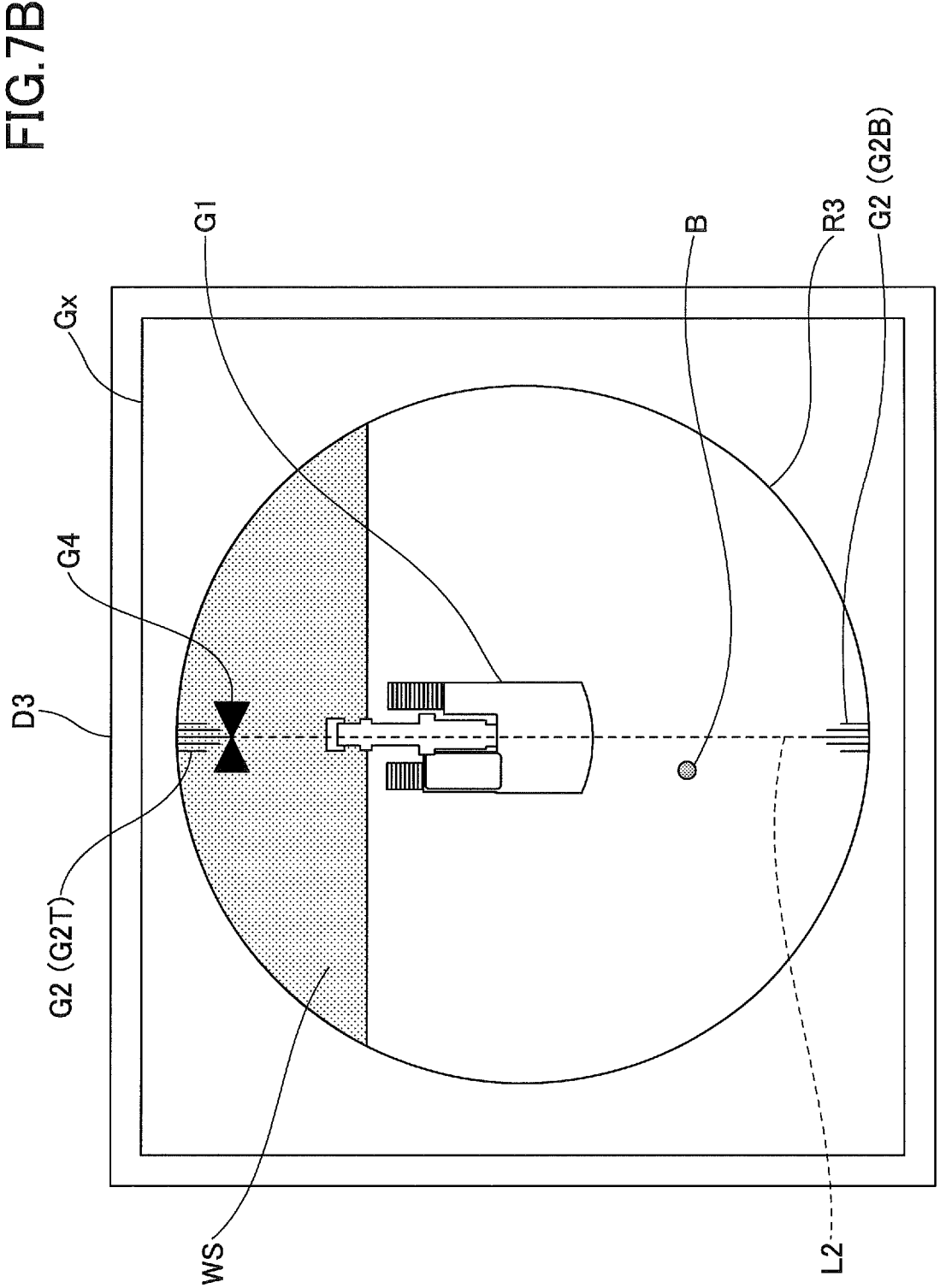
FIG. 7B is a diagram illustrating an example of the output image.

Next, referring to FIG. 7A and FIG. 7B, another example of the output image is described that is displayed on the display device D3 when the machine guidance device 50 of FIG. 3 is used.

Each of FIG. 7A and FIG. 7B shows an output image Gx including an overall top view image generated by the display device D3 based on respective outputs of the front camera S6F, the left side camera S6L, the right side camera 56R, and the rear camera S6B, which are installed in the shovel of FIG. 4. Specifically, FIG. 7A shows the output image Gx when the shovel does not normally face the slope surface WS; and FIG. 7B shows the output image Gx when the shovel normally faces the slope surface WS.

In each of the output images Gx of FIG. 7A and FIG. 7B, a camera image (overall top view image) generated by the display device D3 is displayed inside the circular region R3, and the shovel icon G1, which is an illustration image representing the top view of the shovel, is arranged at the center of the circular region R3.

The one dot chain line L1v is an example of the image representing the direction orthogonal to the extending direction of the slope surface WS, and the one dot chain line L1v corresponds to the one dot chain line VL1v of FIG. 4. By the work target surface information display unit 508, at least a part of the one dot chain line L1v is superposed onto and displayed on a camera image. In the embodiment, the one dot chain line L1v passes through the center of the circular region R3, and the one dot chain line L1v has a length that is equal to the diameter of the circular region R3. However, the one dot chain line L1v may not pass through the center of the circular region R3. The length of the one dot chain line L1v may not be equal to the diameter of the circular region R3. For example, the one dot chain line L1v may protrude from the circular region R3.

The dashed line L2 is an example of the image representing the orientation of the shovel, and the dashed line L2 corresponds to the front-rear axis of the shovel and the dashed line VL2 of FIG. 4. The dashed line L2 is displayed on the output image Gx by the shovel orientation display unit 509. In the embodiment, the dashed line L2 passes through the center of the circular region R3, and the dashed line L2 has a length that is equal to the diameter of the circular region R3. However, the dashed line L2 may not pass through the center of the circular region R3. The length of the dashed line L2 may not be equal to the diameter of the circular region R3. For example, the dashed line L2 may protrude from the circular region R3, or the dashed line L2 may be displayed outside the circular region R3.

The scale G2 is an example of the image representing an orientation of the shovel. In the embodiment, the scale G2 includes an upper side scale G2T that is arranged at the upper end of the circular region R3; and a lower side scale G2B that is arranged at the lower end of the circular region R3. Each of the upper side scale G2T and the lower side scale G2B is formed of five line segments, and a main scale that is a longest line segment at the center corresponds to the vertical axis of the upper turning body 3. The scale G2 is displayed on the output image Gx by the shovel orientation display unit 509. The scale G2 may be displayed outside the circular region R3. The scale G2 may be omitted.

The arrow G3 of FIG. 7A is an example of an image representing an operation direction for normally facing the shovel to the slope surface WS. In the embodiment, the arrow G3 extends along an outer periphery of the circular region R3 from the dashed line L2 to the one dot chain line L1v. Upon viewing the arrow G3, an operator of the shovel can intuitively find that the shovel can be normally faced to the slope surface WS by turning the upper turning body 3 to the left. For example, an operator can intuitively find that, by turning the upper turning body 3 to the left direction by the turning operation, or by turning the lower traveling body 1 to the left direction by the traveling operation, the shovel can be normally faced to the slope surface WS. The arrow G3 is displayed on the output image Gx by the operation direction display unit 510. The arrow G3 may be displayed outside the circular region R3. The arrow G3 may be blinked.

The normally facing mark G4 of FIG. 7B is an example of an image representing that the shovel normally faces the slope surface WS. In the embodiment, the normally facing mark G4 is arranged at the position of the dashed line L2. The normally facing mark G4 is formed of two triangles, and the two triangles are arranged so that vertices of the two triangles facing each other nip the dashed line L2. At this time, the one dot chain line L1v is parallel to and matches the dashed line L2. The one dot chain line L1v and the arrow G3 are deleted. The one dot chain line L1v may be displayed as it is. Upon viewing the normally facing mark G4, an operator of the shovel can intuitively find that the shovel normally faces the slope surface WS. The normally facing mark G4 is displayed on the output image Gx by the normally facing state display unit 511. The normally facing mark G4 may be displayed outside the circular region R3. The IC normally facing mark G4 may be blinked.

Figure 8A:
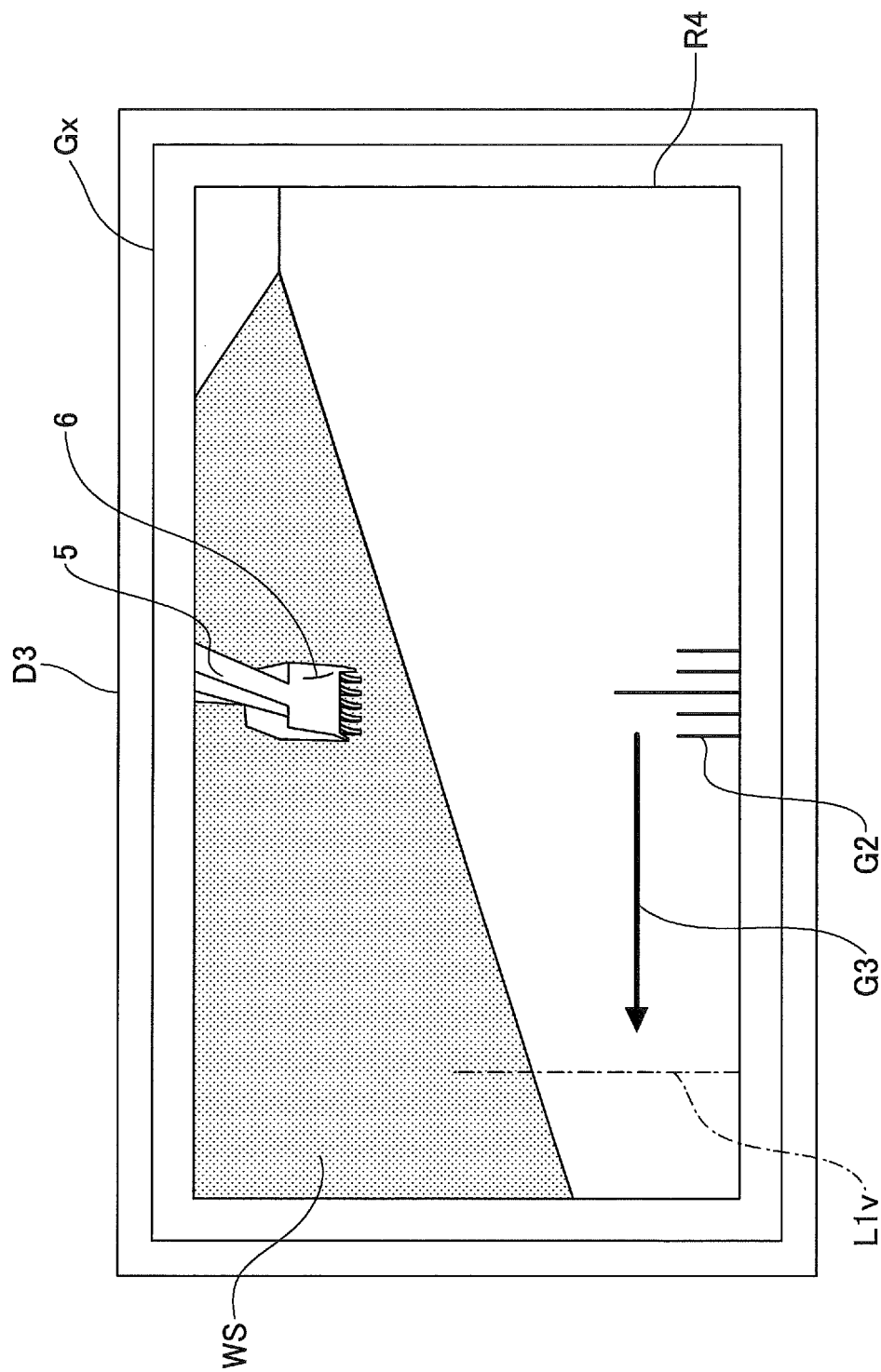
FIG. 8A is a diagram illustrating an example of the output image.

Next, referring to FIG. 8A and FIG. 8B, another example of the output image is described that is displayed on the display device D3 when the machine guidance device 50 of FIG. 3 is used.

Each of FIG. 8A and FIG. 8B shows an output image Gx including a forward view image generated by the display device D3 based on the output of the front camera S6F, which is installed in the shovel of FIG. 4. Specifically, FIG. 8A shows the output image Gx when the shovel does not normally face the slope surface WS; and FIG. 8B shows the output image Gx when the shovel normally faces the slope surface WS.

In each of the output images Gx of FIG. 8A and FIG. 8B, a camera image (forward view image) generated by the display device D3 is displayed inside the rectangular region R4.

The one dot chain line L1v is an example of the image representing the direction orthogonal to the extending direction of the slope surface WS, and the one dot chain line L1v corresponds to the one dot chain line VL1v of FIG. 4. By the work target surface information display unit 508, at least a part of the one dot chain line L1v is superposed onto and displayed on a camera image. In the embodiment, the one dot chain line L1v is displayed so that the one dot chain line L1v is parallel to the vertical axis of the rectangular region R4, and the one dot chain line has a length that is approximately equal to a half of the height of the rectangular region R4. However, the one dot chain line L1v may not be parallel to the vertical axis. The length of the one dot chain line L1v may be longer or shorter. For example, the one dot chain line L1v may protrude from the rectangular region R4.

The scale G2 is an example of the image representing an orientation of the shovel. In the embodiment, the scale G2 is arranged at the lower center of the rectangular region R4. The scale G2 is formed of five line segments, and a main scale that is a longest line segment at the center corresponds to the front-rear axis of the upper turning body 3. The scale G2 is displayed on the output image Gx by the shovel orientation display unit 509. The scale G2 may be displayed outside the rectangular region R4.

The arrow G3 of FIG. 8A is an example of an image representing an operation direction for normally facing the shovel to the slope surface WS. In the embodiment, the arrow G3 extends parallel to the horizontal axis of the rectangular region R4 from the main scale of the scale G2 to the one dot chain line L1v. Upon viewing the arrow G3, an operator of the shovel can intuitively find that the shovel can be normally faced to the slope surface WS by turning the upper turning body 3 to the left. For example, an operator can intuitively find that, by turning the upper turning body 3 to the left direction by the turning operation, or by turning the lower traveling body 1 to the left direction by the traveling operation, the shovel can be normally faced to the slope surface WS. The arrow G3 is displayed on the output image Gx by the operation direction display unit 510. The arrow G3 may be displayed outside the rectangular region R4. The arrow G3 may be blinked.

The normally facing mark G4 of FIG. 8B is an example of an image representing that the shovel normally faces the slope surface WS. In the embodiment, the normally facing mark G4 is arranged at the position of the main scale of the scale G2. The normally facing mark G4 is formed of two triangles, and the two triangles are arranged so that vertices of the two triangles facing each other nip the main scale. At this time, the one dot chain line L1v matches the main scale. The arrow G3 is deleted. Upon viewing the normally facing mark G4, an operator of the shovel can intuitively find that the shovel normally faces the slope surface WS. The normally facing mark G4 is displayed on the output image Gx by the normally facing state display unit 511. The normally facing mark G4 may be displayed outside the rectangular region R4. The normally facing mark G4 may be blinked.

Figure 9:
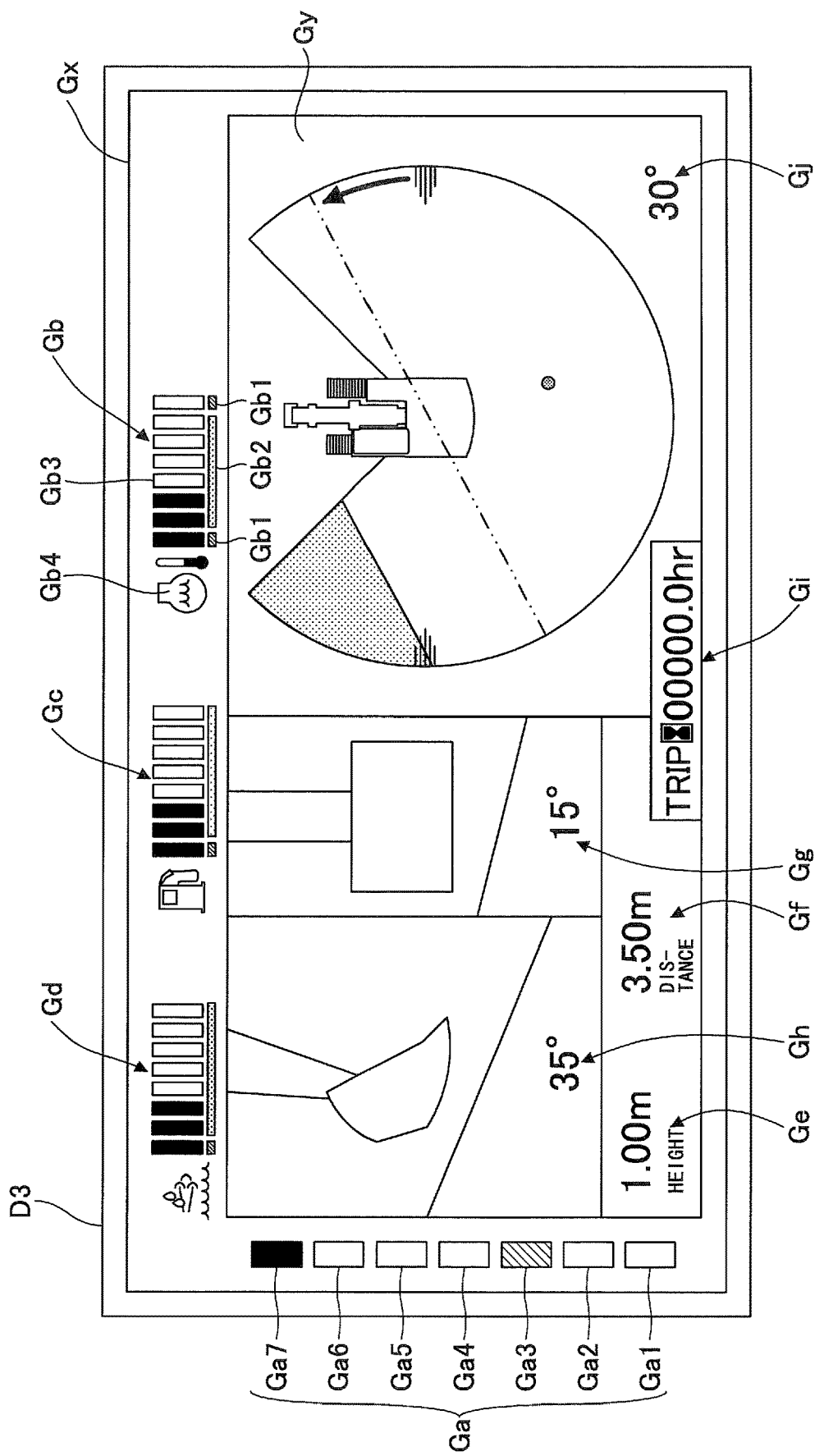
FIG. 9 is a diagram illustrating an example of the output image.

Next, referring to FIG. 9, another example of the output image is described that is displayed on the display device D3 when the machine guidance device 50 of FIG. 3 is used.

FIG. 9 shows an output image Gx including a camera image region Gy including the fan-shaped top view of FIG. 5A or FIG. 5B. The fan-shaped top view of FIG. 5A or FIG. 5B may be replaced with another camera image, such as the rearview image of FIG. 6A or FIG. 63, the overall top view image of FIG. 7A or FIG. 73, or the forward view image of FIG. 8A or FIG. 8B.

The output image Gx of FIG. 9 includes a bucket height display region Ga; a cooling water temperature display region Gb; a fuel residual amount display region Gc; an urea water residual amount display region Gd; a movement height display region Ge; a movement distance display region Gf; a horizontal slope surface angle display region Gg; a vertical slope surface angle display region Gh; an engine operation time display region Gi; and a deviation angle display region Gj. The information displayed in the bucket height display region Ga, the movement height display region Ge, the horizontal slope surface angle display region Gg, the vertical slope surface angle display region Gh, and the deviation angle display region Gj forms the guidance information; and the information displayed in the cooling water temperature display region Gb, the fuel residual amount display region Gc, the urea water residual amount display region Gd, and the engine operation time display region Gi forms the vehicle information. As illustrated in FIG. 9, the machine guidance device 50 simultaneously displays a camera image and at least one of the guidance information and the vehicle information.

The bucket height display region Ga is a display region indicating relation between the current height and a target height of the bucket 6, and the bucket height display region Ga includes, for example, a bar display. The bar display is formed of, for example, seven segments Ga1 through Ga7. The target height of the bucket 6 includes, for example, a height of the front end (tip) of the bucket 6 at a time at which the front end (tip) of the bucket 6 contacts a periphery of a slope surface as a target formation level. In the embodiment, if the current height of the bucket 6 is lower than the target height and a difference between the current height of the bucket 6 and the target height is greater than or equal to 25 cm, the segment Ga1 is in a lighting state. If the current height of the bucket 6 is lower than the target height and the difference is greater than or equal to 1 cm and less than 25 cm, the segment Ga2 is in a lighting state. If the current height of the bucket 6 matches the target height, for example, if the absolute value of the difference is less than 1 cm, the segment Ga3 is in a lighting state. If the current height of the bucket 6 is higher than the target height and the difference is greater than or equal to 1 cm and less 25 cm, the segment Ga4 is in a lighting state. Similarly, if the current height of the bucket 6 is higher than the target height and the difference is greater than or equal to 25 cm and less than 50 cm, the segment Ga5 is in a lighting state; if the current height of the bucket 6 is higher than the target height and the difference is greater than or equal to 50 cm and less than 75 cm, the segment Ga6 is in a lighting state; and if the current height of the bucket 6 is higher than the target height and the difference is greater than or equal to 75 cm, the segment Ga7 is in a lighting state. The segment Ga3 indicated by the oblique line hatching is displayed so as to be distinguishable from other segments, irrespective of the current height of the bucket 6. The reason is to make it possible for an operator to intuitively find a difference between the current height of the bucket 6 and the target height. FIG. 9 shows that the segment Ga7 is in a lighting state, and that the other segments Ga1 through Ga 6 are in the off state.

The cooling water temperature display region Gb is a region for image-displaying a current temperature state of the engine cooling water. In the example illustrated in FIG. 9, a bar graph indicating the temperature state of the engine cooling water is displayed. The temperature of the engine cooling water is based on data output from the water temperature sensor 11c attached to the engine 11.

Specifically, the cooling water temperature display region Gb includes a caution range display Gb1; a normal range display Gb2; a segment display Gb3; and an icon display Gb4.

The caution range display Gb1 is a display to notify an operator that the temperature of the engine cooling water is in a state requiring caution; and the normal range display Gb2 is a display to notify an operator that the temperature of the engine cooling water is in a normal state. The segment display Gb3 is a display for informing an operator whether the temperature of the engine cooling water is high or low. The icon display Gb4 is an icon, such as a symbol figure, representing that the caution range display Gb1, the normal range display Gb2, and the segment display Gb3 are displays related to the temperature of the engine cooling water. The icon display Gb4 may be text information representing that these are displays related to the temperature of the engine cooling water.

In the example illustrated in FIG. 9, the segment display Gb3 is formed of eight segments whose turning-on/turning-off states are individually controlled; and, as the cooling water temperature increases, the number of lighting segments increases. In the example of FIG. 9, three segments are in lighting states, respectively.

In the example illustrated in FIG. 9, the caution range display Gb1 and the normal range display Gb2 are figures arranged along the direction of extension and contraction of the segment display Gb3, respectively. The caution range display Gb1 is always lighted in yellow (oblique line hatching). The normal range display Gb2 is always lighted in green (dot hatching). In the segment display Gb3, two segments on the left and right ends belong to the caution range, and the six central segments belong to the normal range.

The above-described configuration including the caution range display, the normal range display, the segment display, and the icon display is similarly adopted for the fuel residual amount display region Gc and the urea water residual amount display region Gd.

The fuel residual amount display region Gc is a region for image-displaying a residual quantity state of the fuel. The residual amount of the fuel is based on data output by a fuel residual amount sensor.

The urea water residual amount display region Gd is a region for image-displaying a residual quantity state of the urea water that is used for a selective catalytic reduction system. The residual quantity of the urea water is based on data output by an urea water residual amount sensor, which is not depicted.

The movement height display region Ge is a region for displaying a difference in the vertical direction between the reference position and the current position of the bucket 6 as the movement height. For example, if the current position of the bucket 6 is lower than the reference position, the movement height is a positive value; and if the current position of the bucket 6 is higher than the reference position, the movement height is a negative value. In the example of FIG. 9, the movement height is 1.00 m.

The movement distance display region Gf is a region for displaying a difference in the horizontal direction between the reference position and the current position of the bucket 6 as the movement distance. For example, if the current position of the bucket 6 is closer to the upper turning body 3 compared to the reference position, the movement distance is a positive value; and if the current position of the bucket 6 is farther from the upper turning body compared to the reference position, the movement distance is a negative value. In the example of FIG. 9, the movement distance is 3.50 m.

The horizontal slope surface angle display region Gg is a region for displaying a value of a horizontal slope surface angle and an illustration image representing the horizontal slope surface angle. The horizontal slope surface angle is an angle famed between a line segment representing a periphery of the normal surface of the work target in a vertical plane laterally crossing the bucket 6 and the horizontal line. In the example of FIG. 9, the horizontal slope surface angle is 15° downward to the right, when it is viewed from the shovel. Specifically, in the horizontal slope surface angle display region Gg, a first target construction image is displayed that schematically indicates positional relation between the bucket 6 and the target construction surface. In the first target construction surface image, the bucket 6 and the target construction surface, which can be viewed when an operator sits in the cabin 10 and views ahead of the shovel, are schematically displayed by the bucket image and the target construction surface image. The bucket image is a figure representing the bucket 6, and the bucket image is represented by a figure that can be seen when the bucket 6 is viewed from the cabin 10. The target construction surface image is a figure representing the ground as the target construction surface, and the target construction surface image is represented by a figure that can be seen from the cabin, similar to the bucket image. The interval between the bucket image and the target construction surface image is displayed such that the interval varies depending on a change in the actual positional relation (distance) between the front end of the bucket 6 and the target construction surface. Similarly, a relative tilt angle between the bucket image and the target construction surface image is displayed such that the relative tilt angle varies depending on a change in the actual positional relation (relative tilt angle) between the bucket 6 and the target construction surface. By viewing the first target construction surface image, an operator can find the positional relation between the bucket 6 and the target construction surface, and the horizontal slope surface angle. In the first target construction surface image, in order to enhance visibility by the operator, the target construction surface image may be displayed such that the horizontal slope surface angle is greater than the actual horizontal slope surface angle. An operator can recognize the approximate horizontal slope surface angle from the target construction surface image displayed in the first construction target image. In addition, when the operator desires to know a precise horizontal slope surface angle, the operator may view the value of the horizontal slope surface angle, which is numerically displayed below the target construction surface image.

The vertical slope surface angle display region Gh is a region for displaying a vertical slope surface angle and an illustration image representing the vertical slope surface angle. The vertical slope surface angle is an angle formed between a line segment representing a periphery of the normal surface of the work target in a vertical plane vertically crossing the bucket 6 and the horizontal line. In the example of FIG. 9, the vertical slope surface angle of the slope surface, which is an ascending slope when it is viewed from the shovel, is 35°. Specifically, in the vertical slope surface angle display region Gh, a second target construction image is displayed that schematically indicates positional relation between the bucket 6 and the target construction surface. In the second target construction surface image, the bucket 6 and the target construction surface, which are laterally viewed, are schematically displayed by the bucket image and the target construction surface image. The bucket image is represented by a figure that can be seen when the bucket 6 is laterally viewed. The target construction surface image is represented by a figure that is laterally viewed, similar to the bucket image. The interval between the bucket image and the target construction surface image is displayed such that the interval varies depending on a change in the actual positional relation (distance) between the front end of the bucket 6 and the target construction surface. Similarly, a relative tilt angle between the bucket image and the target construction surface image is displayed such that the relative tilt angle varies depending on a change in the actual positional relation (relative tilt angle) between the bucket 6 and the target construction surface. By viewing the second target construction surface image, an operator can find the positional relation between the bucket 6 and the target construction surface, and the vertical slope surface angle. In the second target construction surface image, in order to enhance visibility by the operator, the target construction surface image may be displayed such that the tilt angle is greater than the actual tilt angle. An operator can recognize the approximate vertical slope surface angle from the target construction surface image displayed in the second construction target image. In addition, when the operator desires to know a precise vertical slope surface angle, the operator may view the value of the vertical slope surface angle, which is numerically displayed below the target construction surface image.

The engine operation time display region Gi is a region for image-displaying an accumulated operation time of the engine 11. In the example illustrated in FIG. 9, a value using the unit "hr (hour)" is displayed.

The deviation angle display region Gj is a region for displaying a deviation angle. The deviation angle is an angle representing an absolute value of the deviation from the state in which the shovel normally faces the slope surface. For example, the deviation angle is an angle formed between the front-rear axis of the shovel and the direction orthogonal to the extending direction of the slope surface that is the work target. For example, in the state in which the shovel normally faces the slope surface, the deviation angle is 0°, and the deviation angle increases as the upper turning body 3 of the shovel turns in the right direction. In the example of FIG. 9, the deviation angle is 30°.

As described above, the machine guidance device 50 displays the image representing the extending direction of the slope surface WS that is the work target or the direction orthogonal to the extending direction, while superposing the image onto the camera image. For example, the one dot chain line L1v representing the direction orthogonal to the extending direction of the slope surface WS, or the two dot chain line L1p representing the extending direction of the slope surface WS is superposed onto and displayed on a camera image, such as the fan-shaped top image, the rearview image, the overall top view image, or the forward view image. Accordingly, by viewing the output image Gx, for example, an operator of the shovel can intuitively find that the shovel can be caused to normally face the slope surface by what extent of the turning operation. As a result, the machine guidance device 50 can enhance the operability of the shovel.

The machine guidance device 50 displays an image representing an orientation of the shovel on the output image Gx. For example, the dashed line L2 corresponding to the front-rear axis of the shovel and the scale G2 corresponding to the left-right axis of the shovel are superposed onto and displayed on a camera image. As a result, an operator viewing the output image Gx can intuitively find, for example, how much extent the orientation of the shovel is deviated from the orientation of the shovel in the normally facing state.

The machine guidance device 50 displays, on the output image Gx, the arrow G3 representing the operation direction for normally facing the shovel to the slope surface WS. As a result, the operator of the shovel viewing the output image Gx can intuitively find, for example, how much extent the turning operation or the traveling operation is to be performed in which one of the right direction and the left direction, so as to cause the shovel to normally face the slope surface WS.

Upon detecting that the shovel normally faces the slope surface WS, the machine guidance device 50 displays, on the output image Gx, an image indicating that a normally facing state is established. For example, upon detecting that the shovel normally faces the slope surface WS, the machine guidance device 50 causes the normally facing mark G4 to be blinked. As a result, the operator of the shovel viewing the output image Gx can intuitively find, for example, that the shovel normally faces the slope surface WS.

The preferred embodiment of the present disclosure is described above. However, the present invention is not limited to the above-described embodiment. Various modifications and substitutions may be made to the above-described embodiment without departing from the scope of the present invention.

For example, in the above-described embodiment, upon detecting that the shovel normally faces the slope surface WS, the machine guidance device 50 displays the normally facing mark G4 on the output image Gx; however, the operator may be informed that the shovel normally faces the slope surface WS by audio information.

The machine guidance device 50 may notify, by audio information, the operator of the operation direction, the deviation angle, etc., for normally facing the shovel to the slope surface WS.

The invention claimed is:

1. A shovel comprising:
   a lower travelling body;
   an upper turning body pivotably attached to the lower traveling body;
   a camera attached to the upper turning body;
   a processor; and
   a memory that includes instructions, which when executed, cause the processor to execute the following steps:
   generating an output image including a camera image captured by the camera; and
   displaying a line image representing a normal direction of a work target surface or a direction orthogonal to the normal direction and the camera image while superposing the line image on the camera image,
   wherein, upon detecting that a front-rear axis of the shovel is in the normal direction of the work target surface, the processor displays, within the camera image, the line image in a direction within the camera image corresponding to the normal direction or the direction orthogonal to the normal direction.

2. The shovel according to claim 1, wherein the steps executed by the processor further include:
   displaying an orientation image representing an orientation of the shovel on the output image.

3. The shovel according to claim 1, wherein the camera image is a top view.

4. The shovel according to claim 1, wherein the steps executed by the processor further include:
   displaying, on the output image, an arrow indicating an operation direction for causing the front-rear axis of the shovel to be in the normal direction of the work target surface.

5. The shovel according to claim 4, wherein the operation direction is a turning direction or a traveling direction.

6. The shovel according to claim 1, wherein the steps executed by the processor further include:
   displaying a first line segment indicating the normal direction of the work target surface or the direction orthogonal to the normal direction, a second line segment indicating an orientation of the shovel, and the camera image, while superposing the first line segment and the second line segment onto the camera image,
   wherein, when the front-rear axis of the shovel is in the normal direction of the work target surface, the first line segment and the second line segment are in parallel with each other, or the first line segment and the second line segment are matched with each other.

7. The shovel according to claim 1, wherein the steps executed by the processor further include:
   upon detecting that the front-rear axis of the shovel is in the normal direction of the work target surface, displaying, on the output image, an image indicating that the front-rear axis of the shovel is in the normal direction of the work target surface.

8. The shovel according to claim 1, wherein the steps executed by the processor further include:
   displaying guidance information.

9. The shovel according to claim 1, wherein the steps executed by the processor further include:
   displaying vehicle information.

10. The shovel according to claim 1, wherein the steps executed by the processor further include:
    simultaneously displaying the camera image and a target construction surface display image representing positional relation between a bucket and a target construction surface, wherein the target construction surface display image includes a figure of the bucket and a figure of the target construction surface that are based on a lateral view of the bucket; and
    varying the target construction surface display image in accordance with a change in the positional relation between the bucket and the target construction surface.

11. The shovel according to claim 1, wherein the steps executed by the processor further include:
    simultaneously displaying the camera image and a target construction surface display image representing positional relation between a bucket and a target construction surface, wherein the target construction surface display image includes a figure of the bucket and a figure of the target construction surface that are obtained by viewing the bucket from a cabin; and
    varying the target construction surface display image in accordance with a change in the positional relation between the bucket and the target construction surface.

12. The shovel according to claim 1, wherein the steps executed by the processor further include:
    simultaneously displaying the camera image and a bar display representing relation between a height of the bucket and a height of a target construction surface.

13. A display device of a shovel, wherein the shovel includes
    a lower travelling body;
    an upper turning body pivotably attached to the lower traveling body;
    a camera attached to the upper turning body; and
    the display device,
    wherein the display device includes
    a processor; and
    a memory that includes instructions, which when executed, cause the processor to execute the following steps:
    generating an output image including a camera image captured by the camera; and
    displaying a line image representing a normal direction of a work target surface or a direction orthogonal to the normal direction and the camera image while superposing the line image on the camera image,
    wherein, upon detecting that a front-rear axis of the shovel is in the normal direction of the work target surface, the processor displays, within the camera image, the line image in a direction within the camera image corresponding to the normal direction or the direction orthogonal to the normal direction.

* * * * *